(12) United States Patent
Lerner et al.

(10) Patent No.: US 11,940,970 B2
(45) Date of Patent: *Mar. 26, 2024

(54) ASSET INVENTORY RECONCILIATION SERVICES FOR USE IN ASSET MANAGEMENT ARCHITECTURES

(71) Applicant: Tripwire, Inc., Portland, OR (US)

(72) Inventors: Aaron Lerner, Portland, OR (US); Adam Montville, Portland, OR (US)

(73) Assignee: TRIPWIRE, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,765

(22) Filed: May 7, 2019

(65) Prior Publication Data

US 2019/0332572 A1 Oct. 31, 2019

Related U.S. Application Data

(63) Continuation of application No. 14/218,511, filed on Mar. 18, 2014, now Pat. No. 10,282,426.

(60) Provisional application No. 61/800,134, filed on Mar. 15, 2013.

(51) Int. Cl.
*G06F 16/23* (2019.01)
*G06F 16/2455* (2019.01)
*G06F 16/25* (2019.01)
*G06F 16/27* (2019.01)

(52) U.S. Cl.
CPC ........ *G06F 16/23* (2019.01); *G06F 16/24564* (2019.01); *G06F 16/25* (2019.01); *G06F 16/252* (2019.01); *G06F 16/273* (2019.01)

(58) Field of Classification Search
None
See application file for complete search history.

(56) References Cited

U.S. PATENT DOCUMENTS

| | | |
|---|---|---|
| 7,243,348 B2 | 7/2007 | Good et al. |
| 7,316,016 B2 | 1/2008 | DiFalco |
| 7,360,099 B2 | 4/2008 | DiFalco et al. |
| 7,587,754 B2 | 9/2009 | DiFalco et al. |
| 7,620,715 B2 | 11/2009 | DiFalco et al. |
| 7,765,460 B2 | 7/2010 | DiFalco et al. |
| 7,772,972 B2 | 8/2010 | Kuroda et al. |
| 7,822,724 B2 | 10/2010 | DiFalco et al. |
| 8,037,036 B2 | 10/2011 | Blumenau et al. |
| 8,140,635 B2 | 3/2012 | DiFalco |
| 8,176,158 B2 | 5/2012 | DiFalco et al. |
| 8,397,128 B1 | 3/2013 | Alonzo et al. |

(Continued)

OTHER PUBLICATIONS

Kim et al., "Experiences with Tripwire: Using Integrity checkers for Intrusion Detection," Computer Science Technical Reports, Report No. 94-012, 15 pp. (Mar. 1994).

(Continued)

*Primary Examiner* — Neveen Abel Jalil
*Assistant Examiner* — John J Morris
(74) *Attorney, Agent, or Firm* — Fredrikson & Byron, P.A.

(57) ABSTRACT

Disclosed below are representative embodiments of methods, apparatus, and systems for managing, monitoring, controlling, and/or classifying assets in an information technology ("IT") environment. Certain embodiments leverage bath services oriented architecture concepts and event mechanisms to create a platform with which additional controls can easily integrate.

15 Claims, 14 Drawing Sheets

(56) References Cited

U.S. PATENT DOCUMENTS

| | | |
|---|---|---|
| 8,566,823 B2 | 10/2013 | Wagner et al. |
| 8,600,996 B2 | 12/2013 | Good et al. |
| 8,819,491 B2 | 8/2014 | Whitlock et al. |
| 8,862,941 B2 | 10/2014 | Whitlock et al. |
| 8,868,987 B2 | 10/2014 | Wagner |
| 8,875,129 B2 | 10/2014 | Wagner et al. |
| 8,914,341 B2 | 12/2014 | DiFalco |
| 8,996,684 B2 | 3/2015 | Good et al. |
| 9,026,646 B2 | 5/2015 | Whitlock et al. |
| 9,209,996 B2 | 12/2015 | DiFalco |
| 9,256,841 B2 | 2/2016 | DiFalco et al. |
| 2003/0233287 A1 | 12/2003 | Sadler et al. |
| 2005/0002380 A1 | 1/2005 | Miller et al. |
| 2006/0089895 A1 | 4/2006 | Joye et al. |
| 2006/0129415 A1* | 6/2006 | Thukral ............... G06Q 50/26 705/28 |
| 2006/0136327 A1 | 6/2006 | You |
| 2006/0136585 A1* | 6/2006 | Mayfield ............... G06F 7/32 709/224 |
| 2006/0178954 A1 | 8/2006 | Thukral et al. |
| 2006/0238919 A1 | 10/2006 | Bradley |
| 2006/0242277 A1 | 10/2006 | Torrence et al. |
| 2006/0294151 A1* | 12/2006 | Wong ............... G06Q 30/02 |
| 2007/0043786 A1 | 2/2007 | DiFalco et al. |
| 2007/0050467 A1* | 3/2007 | Borrett ............... G06Q 10/10 709/213 |
| 2007/0124255 A1 | 5/2007 | DiFalco et al. |
| 2007/0299977 A1* | 12/2007 | Markel ............... H04L 41/0293 709/229 |
| 2008/0077617 A1 | 3/2008 | Schulz et al. |
| 2008/0243921 A1 | 10/2008 | Ellisor |
| 2008/0291023 A1 | 11/2008 | Anderson |
| 2009/0043867 A1* | 2/2009 | Sharp ............... G06F 16/27 709/218 |
| 2009/0063318 A1 | 3/2009 | Alonzo et al. |
| 2010/0161577 A1* | 6/2010 | Morozov ............... G06F 16/285 707/705 |
| 2011/0004622 A1 | 1/2011 | Marson |
| 2011/0138038 A1 | 6/2011 | Good et al. |
| 2012/0023076 A1 | 1/2012 | Torrence et al. |
| 2012/0033852 A1 | 2/2012 | Kennedy et al. |
| 2012/0046978 A1 | 2/2012 | Cartwright |
| 2012/0072430 A1 | 3/2012 | Park |
| 2012/0078908 A1 | 3/2012 | Djordjevic et al. |
| 2012/0117039 A1* | 5/2012 | Apte ............... G06Q 10/087 707/694 |
| 2012/0233138 A1 | 9/2012 | Nijim et al. |
| 2013/0054601 A1 | 2/2013 | Whitlock et al. |
| 2013/0073704 A1 | 3/2013 | Whitlock et al. |
| 2013/0110794 A1 | 5/2013 | Lee |
| 2013/0117046 A1* | 5/2013 | Chaudhri ............... G16H 10/60 705/3 |
| 2013/0151423 A1 | 6/2013 | Schmidt |
| 2013/0339205 A1 | 12/2013 | Vann-Adibe et al. |
| 2014/0032547 A1 | 1/2014 | Webster et al. |
| 2014/0053145 A1 | 2/2014 | Steigleder |
| 2014/0075327 A1 | 3/2014 | Noel et al. |
| 2014/0082620 A1 | 3/2014 | Wagner et al. |
| 2014/0096181 A1 | 4/2014 | Rivers |
| 2014/0149494 A1* | 5/2014 | Markley ............... H04W 4/60 709/203 |
| 2014/0279992 A1* | 9/2014 | Morozov ............... G06F 16/951 707/706 |
| 2014/0288996 A1 | 9/2014 | Rence et al. |
| 2015/0381419 A1* | 12/2015 | Kumar ............... G06F 16/24578 709/224 |
| 2016/0117349 A1* | 4/2016 | Segaran ............... G06F 16/215 707/803 |

OTHER PUBLICATIONS

Kim et al., "The Design and Implementation of Tripwire: A File System Integrity Checker," Computer Science Technical Reports, Report No. 93-071, 23 pp. (Nov. 1993).

* cited by examiner

ASSET INVENTORY RECONCILIATION SERVICES FOR USE IN ASSET MANAGEMENT ARCHITECTURES

CROSS-REFERENCE TO RELATED APPLICATIONS

This application is a continuation of U.S. patent application Ser. No. 14/218,511, filed on Mar. 18, 2014, and entitled "ASSET INVENTORY RECONCILIATION SERVICES FOR USE IN ASSET MANAGEMENT ARCHITECTURES" which claims the benefit of U.S. Provisional Application No. 61/800,134, filed on Mar. 15, 2013, and entitled "ASSET MANAGEMENT ARCHITECTURES" which are hereby incorporated herein by reference in their entirety.

FIELD

This application relates generally to the field of information technology ("IT") compliance and configuration control, asset control, and asset management.

SUMMARY

Disclosed below are representative embodiments of methods, apparatus, and systems for managing, monitoring, controlling, and/or classifying assets in an information technology ("IT") environment. Certain embodiments leverage both services oriented architecture concepts and eventing mechanisms to create a platform with which additional controls can easily integrate. The disclosed methods, apparatus, and systems should not be construed as limiting in any way. Instead, the present disclosure is directed toward all novel and/or nonobvious features and aspects of the various disclosed embodiments, alone or in various combinations and subcombinations with one another.

DETAILED DESCRIPTION

I. General Considerations

Figure 1:
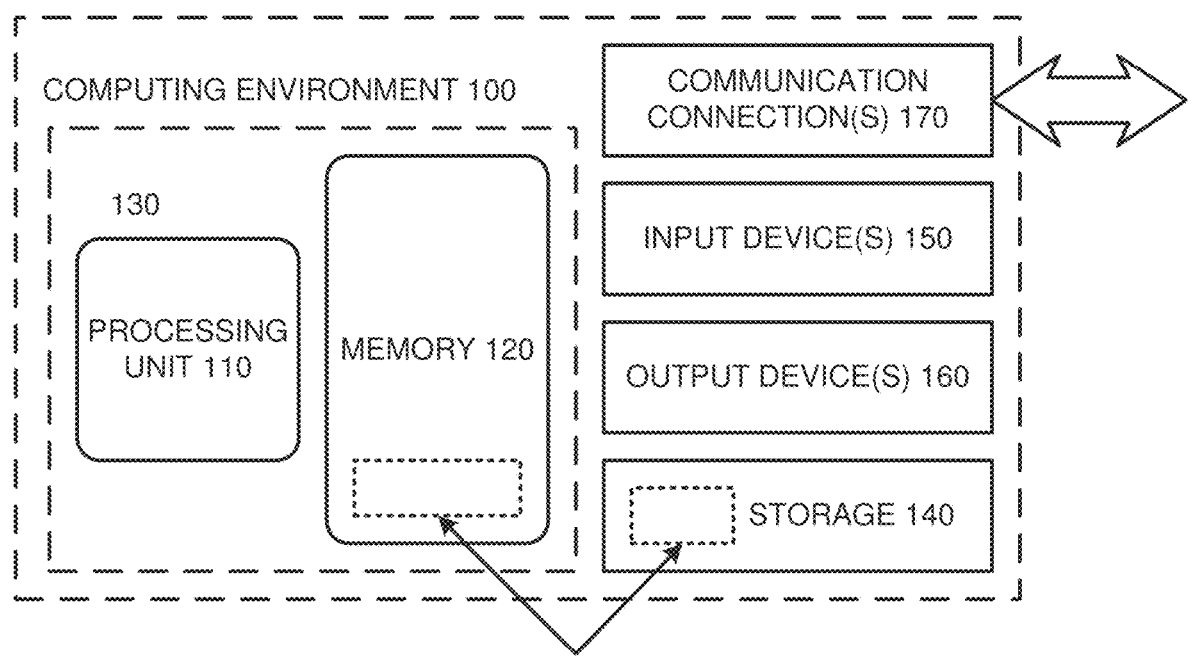
FIG. 1 illustrates a generalized example of a suitable computing environment in which several of the described embodiments can be implemented.

Disclosed below are representative embodiments of methods, apparatus, and systems for managing, monitoring, controlling, and/or classifying assets in an information technology ("IT") environment. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, or the sake of simplicity, the attached figures may not show the various ways in which the disclosed methods can be used in conjunction with other methods. Additionally, the description sometimes uses terms like "determine," "receive," and "select," to describe the disclosed methods. These terms are high-level abstractions of the actual operations that are performed. The actual operations that correspond to these terms may vary depending on the particular implementation and are readily discernible by one of ordinary skill in the art. Additionally, as used herein, the term "and/or" means any one item or combination of items in the phrase.

II. Example Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including desktop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Apache, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("AMC") or programmable logic device ("PLD"), such as a field programmable gate array ("FPGA")). The integrated circuit can be embedded in or directly coupled to an electrical device having a suitable display device.

FIG. 1 illustrates a generalized example of a suitable computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing one or more of the described asset management embodiments and/or compliance and configuration control embodiments for operating or using the disclosed technology. For example, the memory 120 can store software 180 for implementing any of the disclosed techniques described herein and their accompanying user interfaces.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory non-volatile memory or storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, smartphone display, tablet display, netbook display, or touchscreen), printer, speaker, CD-writer, or another device that provides output from the computing environment 100.

The communication connection(s) 170 enable communication over a communication medium to another computing entity. The communication medium conveys information such as computer-executable instructions or other data in a, modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140 and do not encompass carrier waves or signals.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 2:
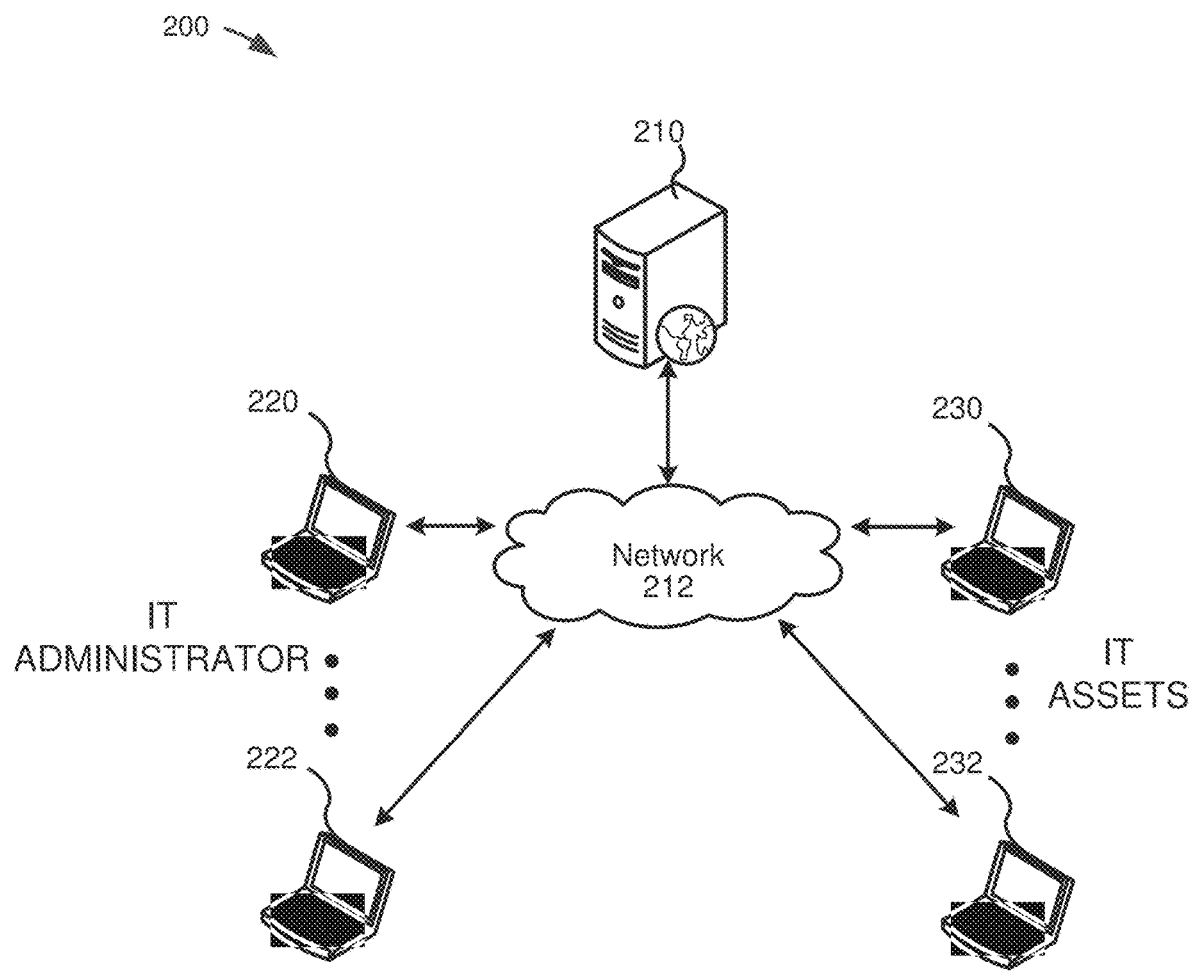
FIGS. 2 and 3 illustrate two example network gies in which several of the described embodiments can be implemented.

An example of a possible network topology (e.g., a client-server network or cloud-based network) for implementing a system according to the disclosed technology is depicted in FIG. 2. Networked computing devices 220, 222, 230, 232 can be, for example, computers running a browser, plug-in, or other software that communicates with one or more central computers 210 (e.g., one or more servers in a cloud computing environment) via network 212. The computing devices 220, 222, 230, 232 and the central computer 210 can have computer architectures as shown in FIG. 1 and discussed above. The computing devices 220, 222, 230, 232 are not limited to traditional personal computers but can comprise other computing hardware configured to connect to and communicate with a network 212 (e.g., smart phones or other mobile computing devices, servers, network devices, dedicated devices, and the like).

In the illustrated embodiment, the computing devices 220, 222, 230, 232 are configured to communicate with one or more central computers 210 via a network 212 (e.g., using a cloud network or other client-server network). In certain implementations, the central computers 210 execute software for performing any of the disclosed asset management functionalities (e.g., CCC tool functions, security control tool functions, asset inventory reconciliation, or analytics), for implementing any of the disclosed graphical user interfaces, and/or for computing any one or more of the intermediate or final values associated with the disclosed embodiments. The central computers 210 can transmit data to any of the computing devices 220, 222 (e.g., data to be displayed on a graphical user interface or web page at the computing devices 220, 222). For example, the computing devices 220, 222 (e.g., computing devices associated with an IT administer) can transmit a request for data to the central computer 210 over the network 212. In order to provide the data, the one or more central computers 210 can access data from the computing devices 230, 232 (e.g., computing devices or other devices associated with assets in the IT infrastructure administered by the IT administrator), which can store various types of data used by the IT administrator. For example, the computing devices 230, 232 may store device configuration data, compliance policy data, and/or other such data used by an IT compliance and configuration control tool. Alternatively, the one or more central computers 210 may themselves store the device configuration data, compliance policy, and other such IT data.

Figure 3:
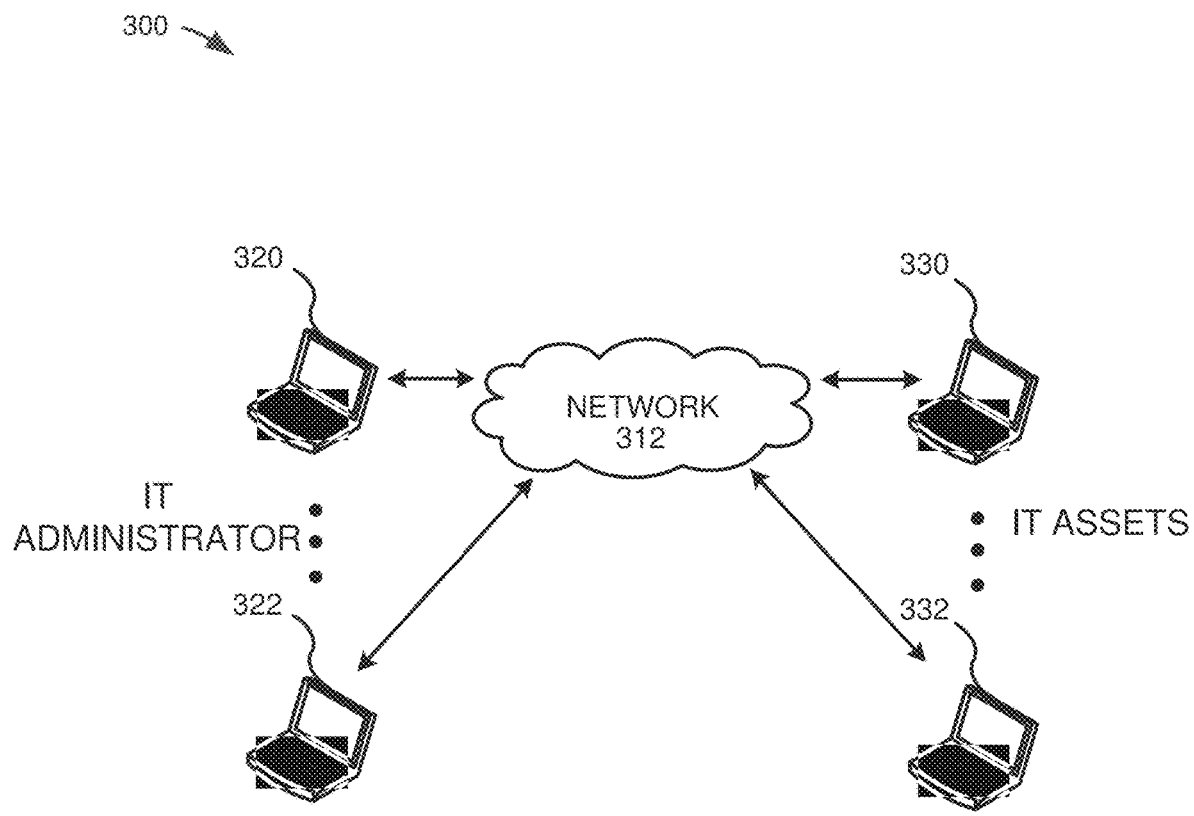

Another example of a possible network topology for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers but can comprise other computing hardware configured to connect to and communicate with a network 312 (e.g., smart phones or other mobile computing devices, servers, network devices, dedicated devices, and the like).

In the illustrated embodiment, the computing devices 320, 322 are configured to communicate directly with computing devices 330, 332 via the network 312. In the illustrated embodiment, the computing devices 320, 322 are configured to locally implement any of the disclosed asset management functionalities (e.g., CCC tool functions, security control tool functions, asset inventory reconciliation, or analytics), implement any of the disclosed graphical user interfaces, and/or compute any one or more of the intermediate or final values associated with the disclosed embodiments. The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322). Any combination of the network topologies of FIGS. 2 and 3 can also be used.

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

III. Introduction to the Disclosed Technology

Described herein are methods, systems, and apparatus that can be used to manage assets in an information technology ("IT") environment. In particular embodiments, the disclosed technology can be used in connection with an IT compliance and configuration control software tool ("CCC tool") that provides compliance and configuration control of one or more IT assets. (In some instance, the CCC tool is also referred to as a configuration management tool or security configuration management tool.) The compliance and configuration control tool can be used to detect, analyze, and report on change activity in an IT infrastructure. For example, the compliance and configuration control tool can assess configurations of the one or more assets at one or more locations and determine whether the assets comply with internal and/or external policies. The compliance and configuration control tool can identify and validate changes to ensure these configurations remain in known and trusted states. This particular usage should not be construed as limiting, however, as the technology can be used more generally with any one or more IT security tools.

One such compliance and configuration control tool that is suitable for use or adaptation to implement embodiments of the disclosed technology is the Tripwire® Enterprise tool available from Tripwire, Inc. A compliance and configuration control tool may be part of a bigger asset management platform that can include other software tools, such as an event logging and management tool or a control security tool, examples of which are the Tripwire® IP360 tool or Tripwire® WebApp360 available from Tripwire, Inc. One such platform that is suitable for use or adaptation to implement embodiments of the disclosed technology is the Tripwire® VIA platform. Similarly, one such event logging and management tool that is suitable for use or adaptation to implement embodiments of the disclosed technology is the Tripwire® Log Center tool.

In some instances, the examples described below reference the Tripwire Enterprise tool, the Tripwire Log Center tool, and the Tripwire VIA platform. These particular usages should not be construed as limiting, however, as the disclosed technology can be used to manage and classify assets using other tools and/or software components.

IV. Example Embodiments of an Improved Asset Management Architecture

A. Introduction

Asset Management is becoming of increasing importance. Business Proposals ("BPs") either explicitly or implicitly require an increasing range of asset management functionality for a typical asset management platform (such as the VIA platform available from Tripwire, Inc.). Additionally, effective asset management is widely recognized in the cybersecurity domain as a necessary condition for effective risk management.

The 20 Critical Security Controls being promulgated by the Council on Cybersecurity (also known as the SANS 20 critical security controls) list asset management (hardware and software) as being of high importance, and, all else being equal, the first two activities an organization should undertake. Asset management requirements are, therefore, not only taken from BPs, but also from Critical Security Controls 1 and 2.

The scope of asset management can quickly creep into the domain of Configuration Management Databases ("CMDBs"), which are more centrally suited to providing IT operations a common view of IT resource information (of which assets are a part) than they are toward supporting security-process-specific use cases. There is, undoubtedly, feature overlap between CMDBs and asset management in the security and compliance and risk management domains.

Asset data stored by a compliance and configuration control ("CCC") tool would typically be viewed, to a CMDB solution, as a Management Data Repository ("MDR"), as defined by the Distributed Management Task Force.

For illustrative purposes, this disclosure will sometimes make reference to one or more the following terms, whose meaning will typically have the associated definition. The definitions listed below, however, should not be construed as limiting, as the terms may have other or additional meaning depending on the context.

Asset: In general, an asset is anything that has value to an organization, including, but not limited to, another organization, person, computing device, information technology (IT) system, IT network, if circuit, software (both an installed instance and a physical instance), virtual computing platform (common in cloud and virtualized computing), or related hardware (e.g., locks, cabinets, keyboards).

Asset Classification: a manner of scoping a subset of assets for use in a particular domain (e.g., security, criticality, geographical, platform, etc.).

Asset Context: semantic information pertaining to an asset providing additional meaning to the role, purpose, criticality, and so on, of the asset.

Asset Description: a piece or collection of information helping to describe the asset in some way.

Asset Discovery: the ability to passively and/or actively identify assets connected to the enterprise.

Asset Environment: the assumed operating environment in which a given asset functions.

Asset Identification: a piece or collection of information helping to uniquely identify a given asset.

Asset Integrity: the establishment and maintenance of asset control with respect to its expected and actual state.

Asset inventory: the collection of known assets.

Asset Reconciliation: the ability to take a potentially incomplete set of information pertaining to one asset and comparing it to information pertaining to other assets with the goal of determining sameness.

Asset Relationship: providing the ability to discover and apply relationships between assets and/or sets of assets.

Configuration Management Database (CMDB): A CMDB typically stores data describing one or more of the following entities: managed resources (such as computer systems and application software); process artifacts (such as incident, problem, and change records); and/or relationships among managed resources and process artifacts. The contents of the CMDB can be managed by a configuration management process and serve as the foundation for other IT management processes, such as change management and availability management.

B. Improved Asset Management Architectures

Figure 4:
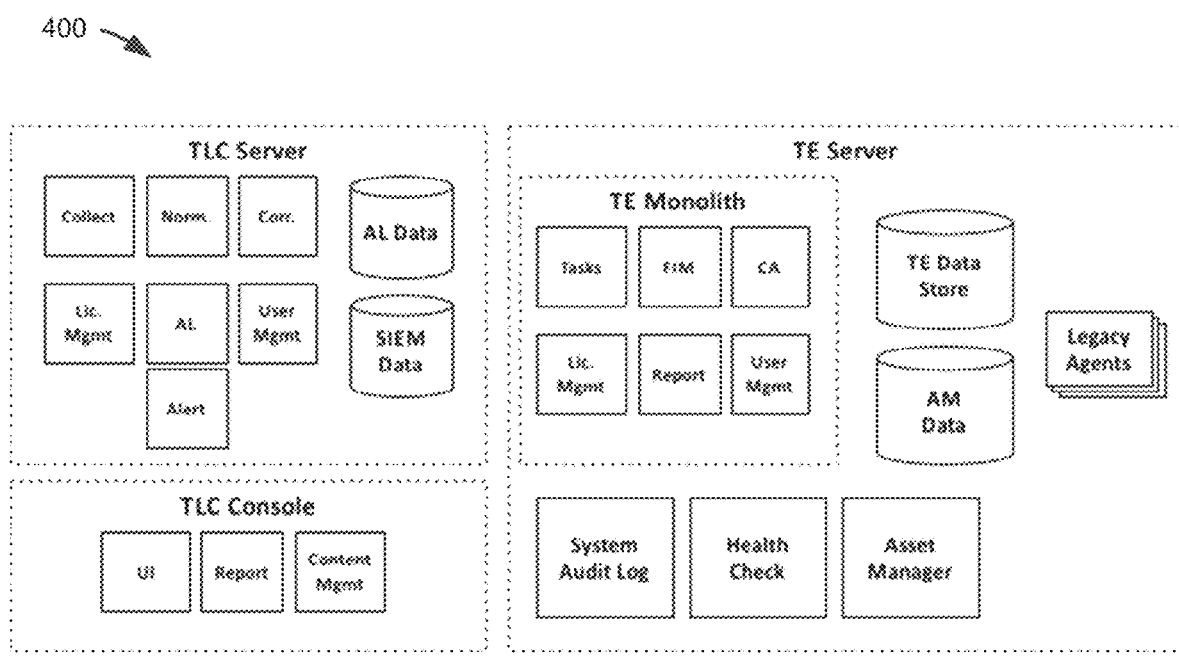
FIG. 4 is a block diagram of a software architecture for an event logging and management tool and a compliance and configuration control tool.
Figure 5:
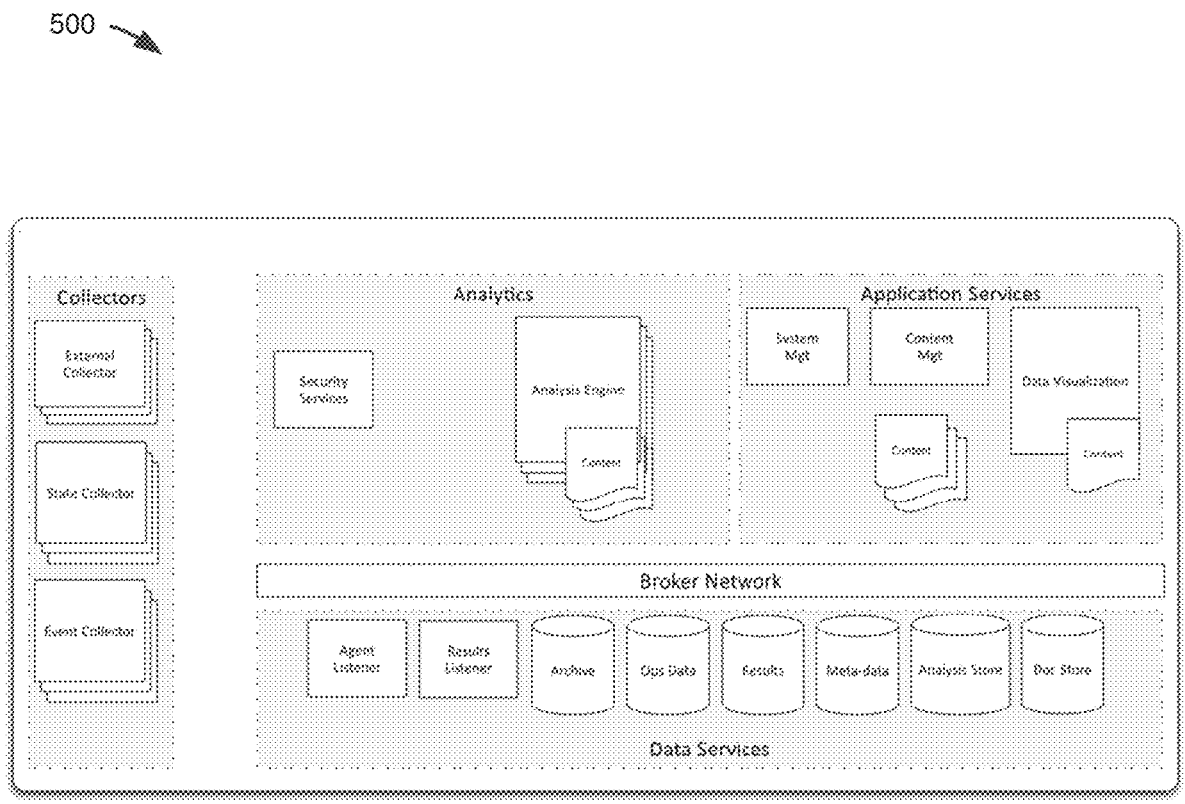
FIG. 5 is a block diagram of an improved asset management software architecture that leverages both services oriented architecture concepts and eventing mechanisms to create a platform with which additional controls can easily integrate.

FIG. 4 is a block diagram of a software architecture 400 for an event logging and management tool (referred to as "TLC" in FIGS. 4 and 5) and a compliance and configuration control tool (referred to as "TE" in FIGS. 4 and 5). In the illustrated architecture, it can be seen that there is little integration between the event logging and management tool and the CCC tool.

By contrast, FIG. 5 is a block diagram of an improved asset management software architecture 500 that leverages both services oriented architecture concepts and eventing mechanisms to create a platform with which additional controls can easily integrate.

C. Example Asset Management Usage Scenarios

This section introduces several possible usage scenarios for embodiments of the improved asset management architecture disclosed herein (e.g., the architecture of FIG. 5). Further details concerning selected ones of these usage scenarios are described more detail below.

1. Correlation of Sensed Data

Information relevant to information security correlation may come from automated tools or manual processes. No matter the origin, the information pertaining to a given asset may not originate from the same tool, in which case the overall solution—that which seeks to aggregate and analyze information from disparate tools—will desirably determine when information pertains to the same or different assets. Embodiments of the disclosed technology can correlate sensed data to accomplish this goal. For example, embodiments of the asset inventory reconciliation service discussed in detail below can be used to correlate sensed data and facilitate creation of an asset inventory that can be accessed and analyzed using a variety of different tools.

2. Federation of Asset Databases

Asset information may be stored across a variety of tools, including, but not necessarily limited to: Active Directory, DHCP servers, information security sensors, inventory management systems, or other such tools. In the case where a solution seeks to aggregate and analyze security-relevant information from multiple tools with disparate notions and collections of assets, a mechanism is desirably available to moderate between the two sources. Embodiments of the disclosed technology can use a federation of databases to accomplish this goal.

3. Targeted Security Automation Actions

Many security-relevant processes require precise identification of particular assets. In the case of configuration assessment, for example, an ad hoc query may need to identify a specific instance of a specific platform family to assess in support of incident response. In the case of taking remedial actions, specific assets are desirably identified to ensure work efficiency. Embodiments of the disclosed technology allow for such targeted security automation action(s).

4. Maintain Asset Inventory

An asset management system desirably has the ability to represent and manage the asset lifecycle over time, including maintaining a list of decommissioned assets for a predefined period of time. Embodiments of the disclosed technology can maintain such an asset inventory.

5. Asset Authorization Management

From time to time, there are specific authorizations assigned to specific assets. For example, only assets used by the sales force and with an active sales person logged-in can connect to a subnet containing sales-specific data. Another way authorizations are used is by creating white, gray, and black lists of software that: (a) is authorized to operate on a given computing device (white); (b) is sometimes authorized to operate on a given computing device (gray); or (c) is not authorized to operate on a given computing device (black). Embodiments of the disclosed technology can provide such asset authorization management.

6. Determine Relationships Between Types of Assets

One function that can be important to a control framework, and therefore to an organizational security policy, is the ability to understand the relationship between different types of assets. A computing device that does not store, process, or transmit critical data should not, for example, be categorized as a critical asset and thereby be subjected to the most stringent controls. Similarly, it can be a requirement to relate a particular computing asset to a specific owner (a personnel asset), especially when remedial actions is to be taken. Without understanding who owns, and is therefore accountable for, a given computing or information asset, it is impossible to efficiently mitigate unnecessary risk. Embodiments of the disclosed technology can determine such relationships between types of assets.

D. Further Aspects of Embodiments of the Disclosed Asset Management Architectures Among the possible advantages that can be realized using embodiments of the disclosed technology are one or more of the following:
a more complete asset management implementation than currently possible with CCC tools;
normalization of the way each software tool in a security platform treats and refers to assets (e.g., by storing data in a format that can be queried directly or inferentially using an appropriate query language (such as SPARQL, which can retrieve and manipulate data stored in a Resource Description Framework format); and/or
asset discovery capabilities in multiple (e.g., all) tools across the security platform; and/or integration with full and/or partial third-party CMDB systems.

1. Objectives

This section discloses example objectives that can be met by embodiments of the disclosed technology. Any one or more of these objectives can be met by implementations of the disclosed technology. Furthermore, the objectives discussed herein are not to be considered limiting, as certain implementations may not meet any of these objectives or may meet supplemental or alternative objectives.

The disclosed objectives are derived from BPs, the SANS 20 critical security controls, and existing product functionality, and can be categorized as follows: asset description, asset reconciliation, asset discovery, and asset context, 2. Possible Architectural Capabilities To support certain primary feature-level objectives, embodiments of the disclosed software tools, techniques, and frameworks have one or more of the following capabilities (e.g., all of the following capabilities):
Normalization of asset information between tools (e.g., between proprietary tools, and/or between the software vendor and third-party tools);
Reconciliation of normalized assets with the side-effect of discovery;
The capability to acquire, establish, and/or maintain asset relationships to other assets (e.g., owned by, installed on, etc.);
Support of asset inventory query, update, add, delete commands; and/or
Support of asset meta-data above and beyond identification (e.g., business context)

To support additional feature-level objectives, embodiments of the disclosed software architecture have one or more of the following capabilities (e.g., all of the following capabilities):
The ability to acquire, establish, and/or maintain asset authorizations;
The ability to provide blocking, uninstallation, and/or other mitigation against unauthorized assets take some temporary remedial action); and/or
The ability to provide alerting capabilities for asset-specific use cases (e.g., CSC controls one and two both require alerting within specific thresholds).

3. Security Considerations

The integrity of asset information is typically of high importance as a foundation to security controls, and therefore to reports supporting business decisions. Any reports based on tainted or incorrect asset information may result in incorrect attribution, remediation instructions, lost revenue, increased expense, and/or a discontinuity of business. In addition, the confidentiality of asset information is likely to be held important in the eyes of IT professionals, organizational policy authorities, and CISOs alike. This is especially true if the asset management system contains any proprietary, secret, or information categorized by law as personally identifying information. Availability of fresh asset information is desired by most security-related business processes, though it is typically not viewed as important as integrity and confidentiality.

As such, embodiments of an asset management solution desirably should take measures to ensure the integrity and confidentiality of the asset information it stores, processes, or transmits. Such embodiment should take reasonable measures to ensure the availability of asset information, but a "highly available" solution is not necessarily required except in the most stringent environments.

E. Example Target Architecture

Figure 6:
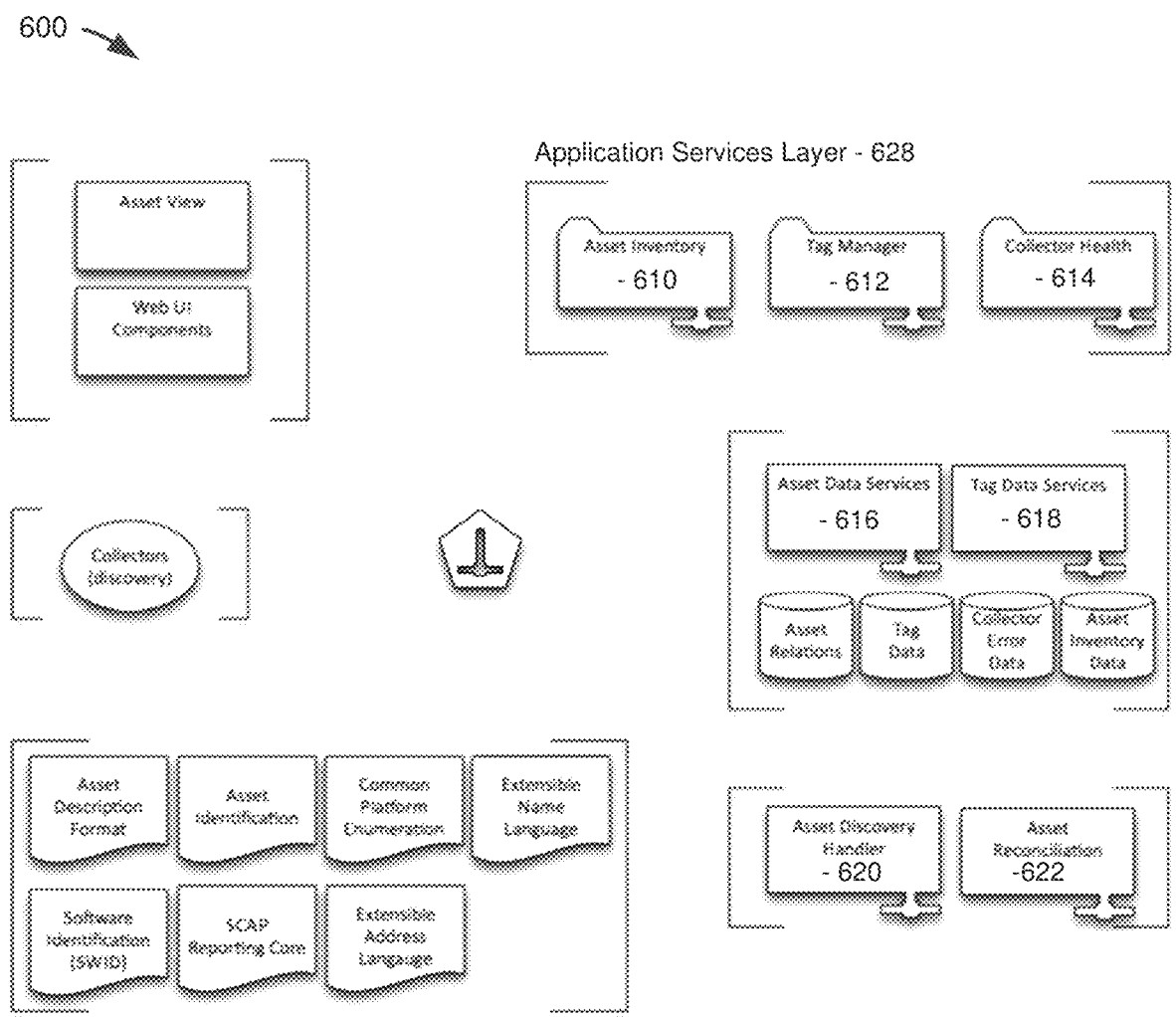
FIG. 6 shows an architecture that depicts the target architecture of FIG. 5 using more specific example tools and components.
Figure 10:
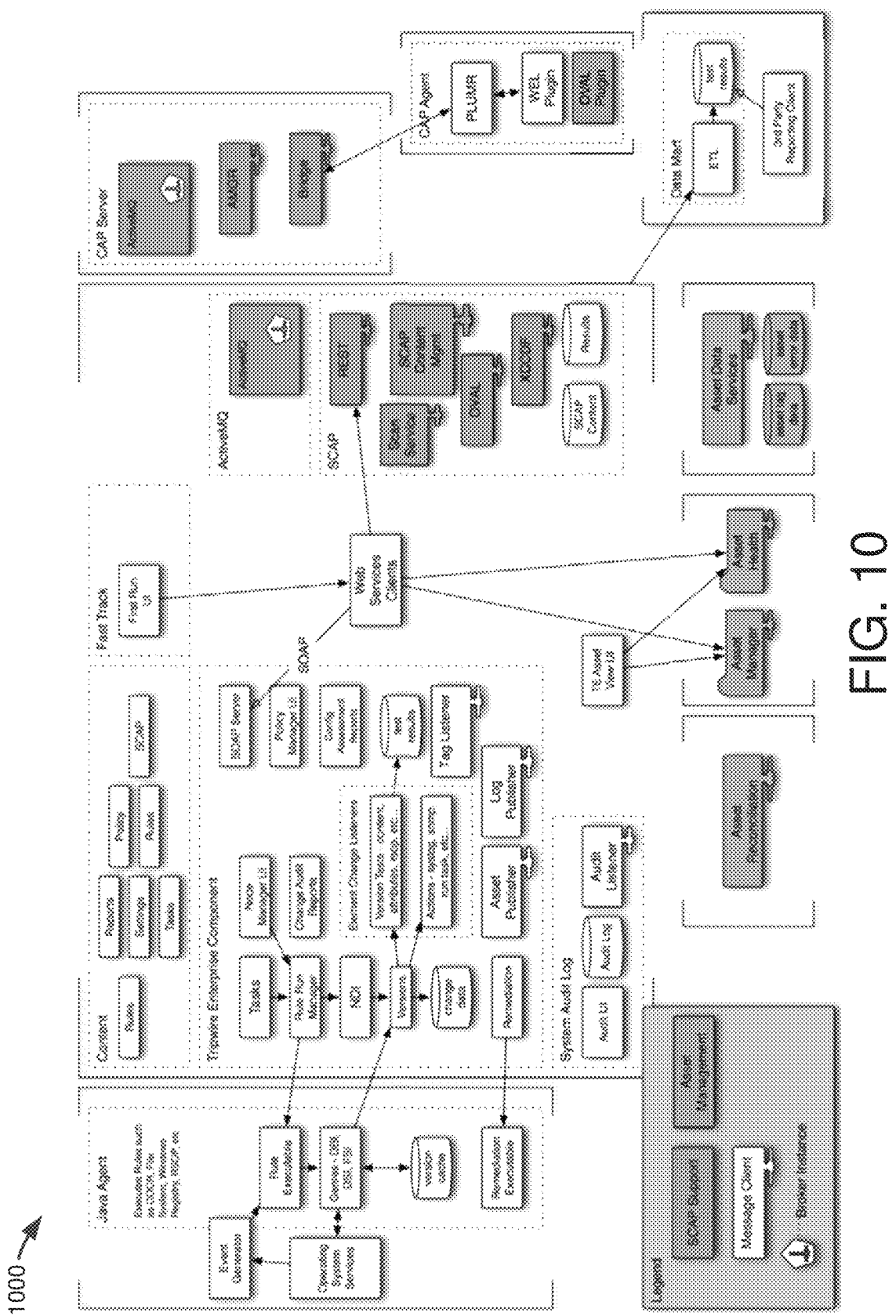
FIG. 10 shows a more detailed exemplary architecture for an example CCC tool implementing an embodiment of the target architecture.
Figure 11:
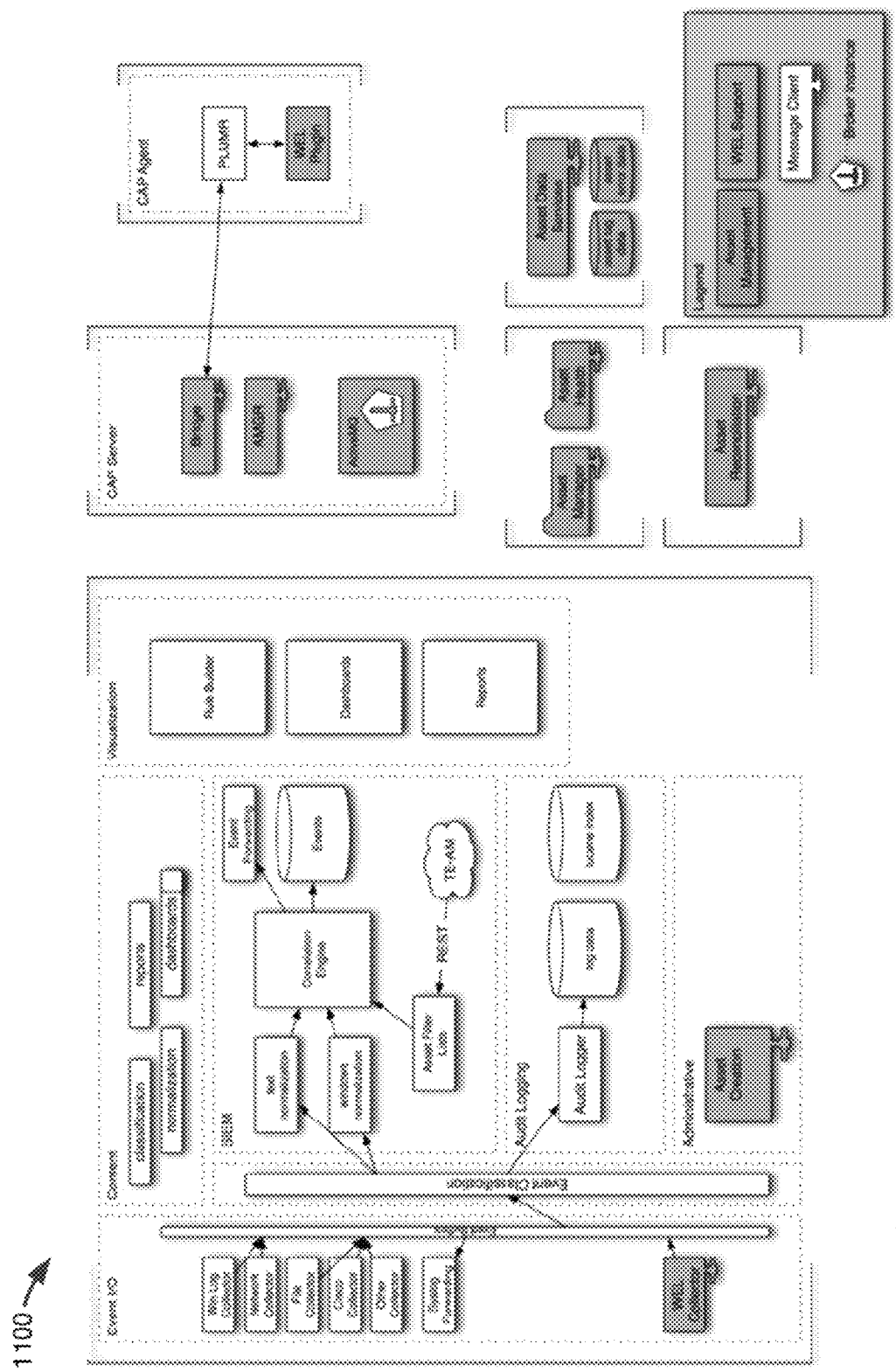
FIG. 11 shows a more detailed exemplary architecture for an event logging and management tool implementing an embodiment of the target architecture

The target architecture 500 of FIG. 5 takes the previously discussed objectives and architectural capabilities into account. FIG. 6 shows an architecture 600 that depicts the target architecture using the tools and components offered by a CCC software provider (in the illustrated embodiment, the components are components offered by Tripwire, Inc. FIG. 10 shows a more detailed exemplary architecture 1000 for a. CCC tool (TE in this example) implementing an embodiment of the target architecture. FIG. 11 shows a more detailed exemplary architecture 1100 for an event logging and management tool (TLC in this example) implementing an embodiment of the target architecture. The following subsections provide additional details for the various components in FIG. 6.

1. Asset Inventory

Example asset inventory component 610 illustrated in FIG. 6 is service oriented and connected to the messaging fabric. It is the source of asset identity information across multiple asset management platform tools and components (e.g., across all tools and components). For example, when scoping assets for application of a particular policy or creating a particular correlation rule, the asset inventory component 610 can be used to identify specific assets.

2. Tag Manner

Example tag manager component 612 illustrated in FIG. 6 is service oriented and connected to the messaging fabric. It is the source of tag information across multiple asset management platform tools and components (e.g., across all tools and components) The presence of this component 612 makes it possible to tag objects in a system well beyond assets. For example, configuration assessment tests can be tagged with specific security properties and context information in support of automation. Further details concerning tag-based asset management systems are disclosed, for example, in U.S. patent application Ser. No. 13/597,242, filed on Aug. 28, 2012, entitled "Managing and Classifying Assets in an Information Technology Environment Using Tags", which is incorporated herein by reference.

3. Collector Health

Example collector health component 614 illustrated in FIG. 6 is service oriented and connected to the messaging fabric. It is the source of all health-related information pertaining to any collector in the system for which health data is available. In the illustrated embodiment, this applies to agents, TLC collectors, TLC correlation rules, and so on. It is often required that any "sensor" be considered a "collector" and this is the very perspective this component takes.

4. Asset Data Services

Example asset data services component 616 illustrated in FIG. 6 is connected to the messaging fabric and lives in the data services layer of the architecture. It is responsible for providing necessary interfaces to handle asset relationships, tag data, collector error data, and asset inventory data.

5. Tat; Data Services

Example tag data services component 618 illustrated in FIG. 6 is connected to the messaging fabric and lives in the data services layer of the architecture. It is responsible for providing necessary interfaces to handle tag data for supported objects across the system. Initially, this may be limited to asset tags, but in the future this capability can be expanded to other objects as warranted (e.g., control frameworks and tests).

6. Asset Discovery Handler

Example asset discovery handler component 620 illustrated in FIG. 6 is connected to the messaging fabric and lives in the analytics layer of the architecture. Its responsibility is to normalize asset information for later use in the system. When results are posted by a given collector, the asset discovery handler can, presumably based on some configuration criteria, inspect results for asset-related information (e.g., 1P address, hostname, and so on), normalize that information into the format the system understands, then put that back on the bus.

7. Asset Reconciliation

Example asset reconciliation component 622 illustrated in FIG. 6 is connected to the messaging fabric and lives in the analytics layer of the architecture. Its responsibility is to apply defined reconciliation rules to a set of assets to determine whether a candidate asset is really an asset the system already manages or a new asset. When a given asset cannot be reconciled with the set of known assets, it becomes a "discovered asset" and is assigned a new reconciliation identifier. In certain embodiments, the asset reconciliation component 622 puts its results onto the messaging fabric. Example embodiments of an asset reconciliation service are described below in Section V.

F. Example Flows

This section discloses in more detail some example usage scenarios that help illustrate aspects of the disclosed technology.

Consider a scenario where an agent (e.g., a VIA agent) is configured through an audit logger to monitor a DHCP log. Throughout the day, the DHCP log is updated, and addresses are assigned, renewed, released, and so on. The agent is collecting and feeding these events to the message broker as they occur. In this example, the audit logger component writes the events to the appropriate location and passes them off to be normalized for correlation purposes (e.g., into a CEE-aligned format). Normalized results are posted to the messaging fabric, where the asset discovery handler 620 will be listening for specific DHCP log events to be posted.

When a DHCP "address issued" message is received, the discovery handler can look at the correlation-normalized information and create a new set of asset identification information related to that potentially new asset. This information is put into the message bus, and the asset inventory component 610 picks it up for storage. When the asset inventory component 610 adds this "new" asset identification to the inventory, this generates a message that is picked up by the asset reconciliation component 622, which then starts the process of determining whether the "new" asset is really a new asset or simply one that is already know about. Its results are posted back to the message fabric and picked up by the asset inventory component 610 where appropriate action is taken. In other embodiments, the asset reconciliation component 622 receives the assets information before it is first stored to the asset inventory component 610 (e.g., as described below with respect to FIG. 13).

In another scenario, a chief information security officer ("CISO") has identified a set of systems that are underperforming by interacting with, for example, a visualization solution. The visualization solution can have a contextual pop-up option automatically alerting the owners of the underperforming system when clicked by the CISO. In this case, the visualization component (a Web UI Component) will interact with the asset inventory component 610 to determine a list of all system owners for the relevant underperforming systems.

To determine the list of owners, and according to one exemplary embodiment, the process starts with the list of underperforming assets. Each asset can have a relation (stored in asset relations DB) that will provide the "owned by," and/or "administered by" relationships. In a case where the asset does not have an "owned by" or "administered by" relationship, the "asset chain" can be analyzed to discover the first owner or administrator. For example, an IIS server requiring remediation may not have the owner or administrator identified, but it is "installed on" another asset which may have an owner or administrator identified. If the operating system does not have an identified owner or administrator, then the computing device (the asset upon which the operating system is installed) should.

Once the list of contacts is returned, the Web UI Component can then interact with whatever alerting capabilities are provided as appropriate to indicate that a system is underperforming.

G. Example Architectural Increments

It may not be possible to migrate directly from an existing asset management architecture to the target architecture in one step. Instead, an incremental approach can be used. An example interim approach based on components offered by Tripwire, Inc., looks at the CCC tool (e.g., TE) and the event logging and management tool (e.g., TLC) separately, each incrementing to common components in the target architecture, starting with the creation of, for example, asset data services 618 over tag data and collector error data, moving asset manager component 624 and asset health component 626 to the application services layer 628 of the architecture, and creating an asset reconciliation analysis engine 622.

Figure 7:
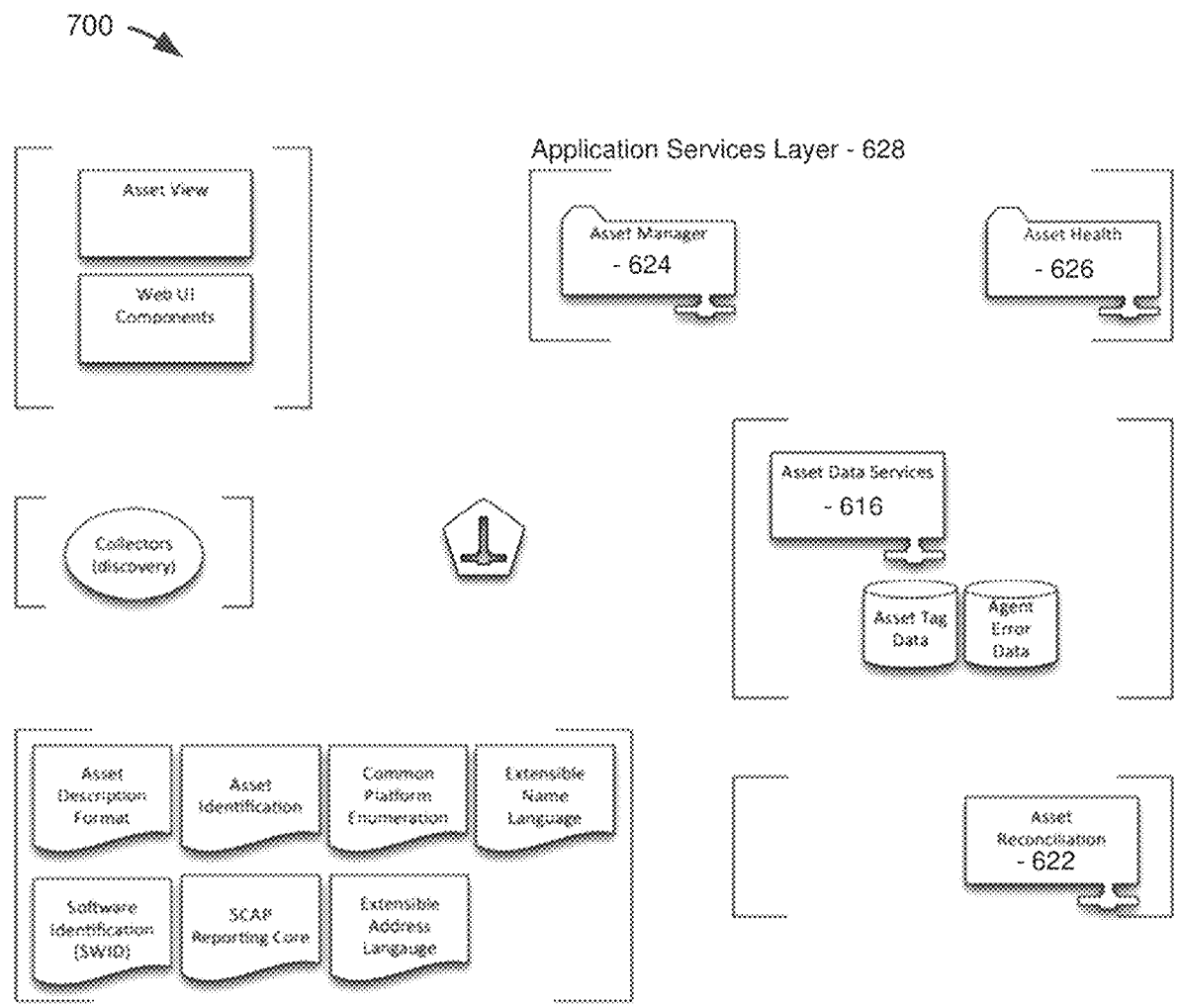
FIG. 7 shows a first incremental migration of the architecture of FIG. 4 toward the architecture of FIG. 6.
Figure 8:
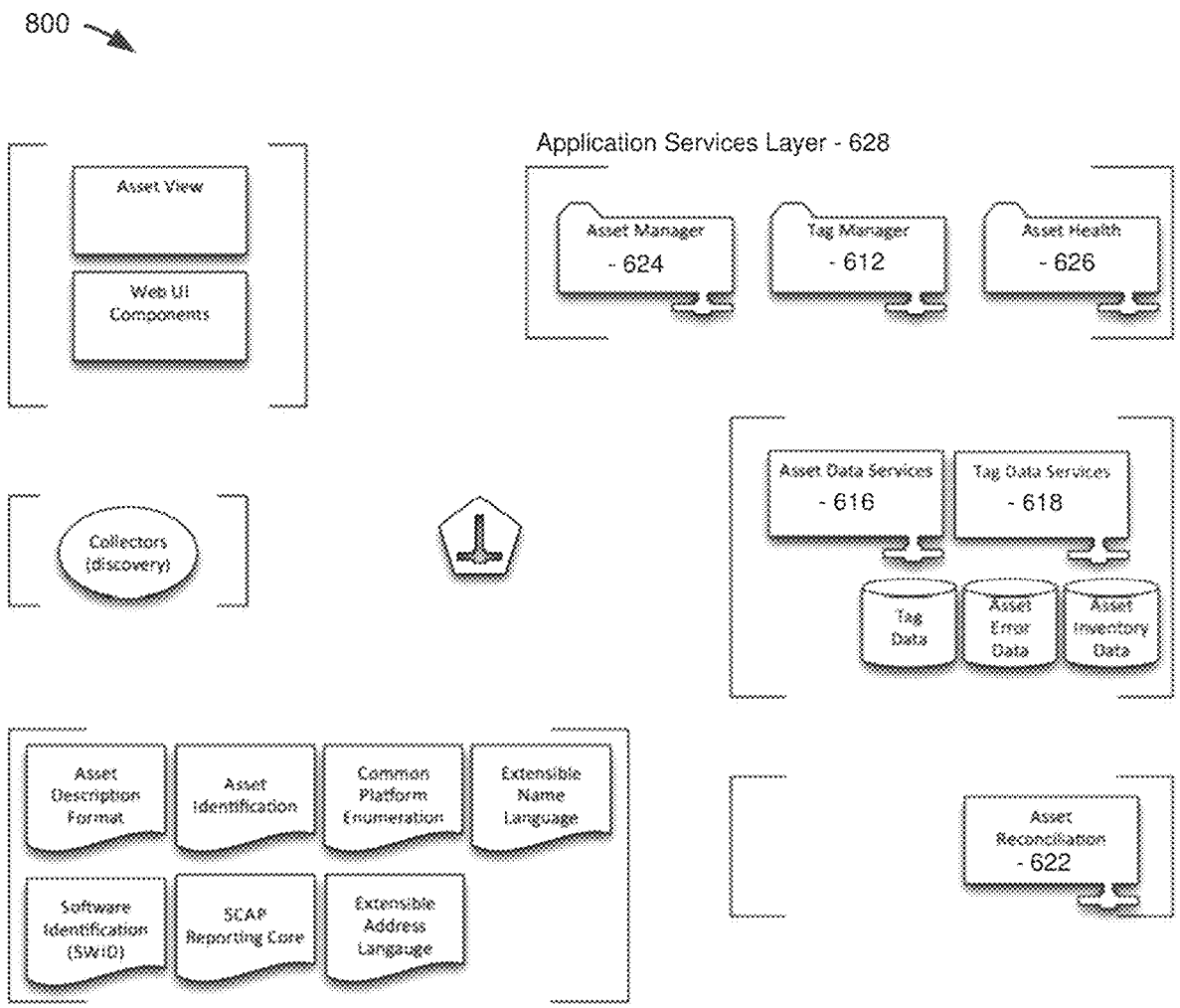
FIG. 8 shows a second incremental migration of the architecture of FIG. 4 toward the architecture of FIG. 6.

The incremental architectures shown in FIGS. 7 and 8 should not be construed as limiting, however, as they merely represent example configurations.

Figure 9:
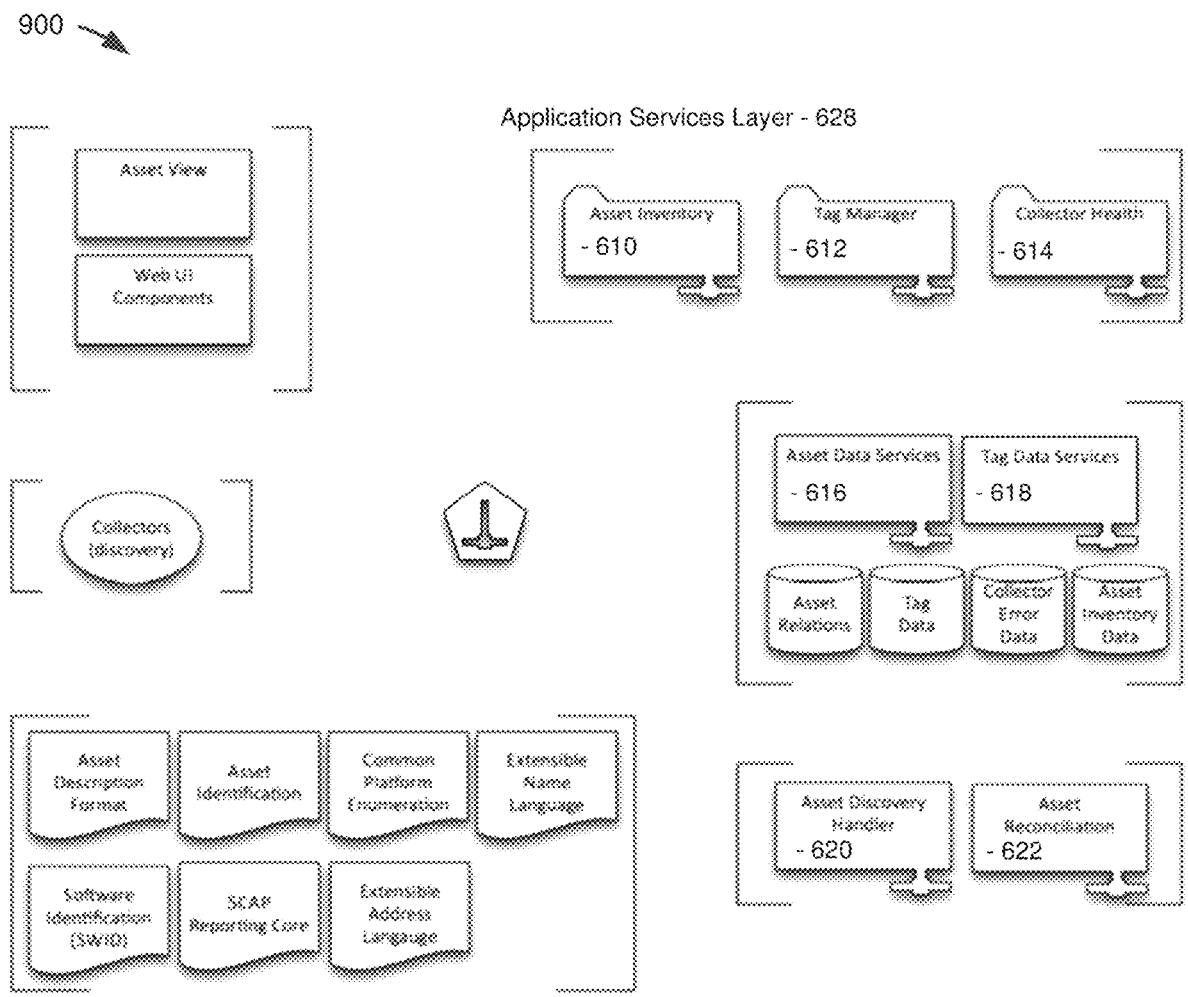
FIG. 9 shows a third incremental migration of the architecture of FIG. 4 toward the architecture of FIG. 6 and corresponds with the target architecture.

In the illustrated embodiment, the common changes in the way TE and TLC work with assets can be viewed as the first increment of an asset management platform. In this first increment (FIG. 7), the foundation is set up for a more major change while minimally affecting the way TE and TLC view assets. The second increment (FIG. 8) effectively promotes tagging to a new level—bringing that architectural capability to more than assets across the asset management platform. The third increment (FIG. 9) is the target architecture and corresponds to FIG. 6.

In certain embodiments, the increments comprise one or more of the following:
- Preparing the architecture for further change and starting to consider a more comprehensive number of items as "assets" (e.g., as discussed above);
- Making tagging available to more assets or items in the architecture; this opens new opportunities for applying intelligence and/or automation outside asset management; and
- Adding relationship capabilities to asset management, changing from "management" to inventory from a nomenclature perspective, and/or centralizing asset discovery analysis.

The increments described relate only to the primary features listed above in the "Possible Architectural Capabilities" section. The "next" features are more advanced features of managing asset authorizations, such as establishing a list of appropriate subnets to which a laptop can connect or providing white-/gray-/black-lists for installed software.

V. Exemplary Asset Reconciliation Embodiments

A. Introduction

In this section, example tools, techniques, and frameworks for performing asset reconciliation are described. The asset reconciliation component is referred to in this section as the "asset inventory support service" and can be applied to perform asset reconciliation as in FIGS. 6-10 but can also be applied in other asset management contexts, such as the general example framework shown in FIG. 12 and the example framework shown in FIG. 13. Any of the described features, components, modules, or method acts can be performed alone or in various combinations and subcombinations with one another or with other tools.

B. Objectives

Embodiments of the disclosed asset inventory support service can fulfill a variety of objectives. In general, embodiments of the disclosed technology are configured to perform a reconciliation of assets from sources that discover new assets. For example, embodiments of the disclosed asset inventory support service can report on the discovery, of new assets by facilitating the collection of assets and/or asset properties not detected by a primary source through integration with other monitoring tools, such as third-party security control products or other asset monitoring tools. The primary source can be a compliance and configuration control tool that has an asset discovery mechanism (e.g., Tripwire Enterprise). Embodiments of the disclosed technology also support analytics by reconciling assets into an asset inventory so that distinct asset counts are available to provide a reliable measure with regard to coverage, through the use of distinct reconciliation identifications. Embodiments of the disclosed technology can also enable an enterprise level inventory of assets for security control product consolidation, meeting enterprise scale goals.

C. Example Use Cases

To illustrate the operation of the disclosed asset inventory service, a number of example workflows are described. These workflows should not be construed as limiting, as the actions performed in the workflows can be performed alone or in any combination or subcombination with one another or with other workflows.

1. First Example Workflow—Enrichment

A first example use case is to enrich asset information through reconciliation with other sources of assets.

In certain embodiments, an initial source of asset information, such as a CMDB storing information collected by a CCC tool, can populate the asset inventory reconciliation service. This source can contain metadata about the asset, such as tagging information or application inventory in the form of a Common Platform Enumeration ("CPE"). CPE is a structured naming scheme for information technology systems, platforms, and packages. When an asset is processed by the asset inventory reconciliation service, a unique reconciliation identification number can be allocated (e.g. a universally unique identifier ("UUID")). A security control application can submit information it contains about the asset to the asset inventory reconciliation service as well, including the synthetic II) allocated by this control, and/or any synthetic IDs it is aware other systems have given the asset (such as a MAC-address, motherboard ID, or simply one shared through another security control application integration).

The asset can then be filtered, normalized, and reconciled with any asset records previously available from the initial asset information source. The security control application's assets are associated to the same reconciliation IDs as the assets in the initial source if they match. For assets that do not match, they are allocated a unique reconciliation ID.

The asset inventory reconciliation service can also be responsive to requests for asset information from the CCC tool, security control tool, or other asset monitoring tool. For example, the asset inventory reconciliation service can respond with the reconciled asset which contains the metadata provided from the initial source as well as information other sources (e.g., the synthetic Ds from all sources). This data can be used, for example, by the security control or other monitoring tool to filter assets when reporting security results or otherwise analyzing asset events.

2. Second Example Workflow—Correlation of Security Results

Building on the events of the first workflow, a second security control application can participate and submit its asset information in the same way to the reconciliation service. In particular embodiments, both security controls submit their asset information to the reconciliation service as the information changes.

Periodically, extract/transform/load ("ETL") processes can be performed to extract security results from each of the security control applications to store in a reporting and analytics data store. The ETL, process consults the reconciliation service to transform each asset so that it can record each asset with its security results in a correlatable form—with the reconciliation ID assigned by the reconciliation service. Security results are stored in relation to the enriched asset into a data store such as a relational database management system ("RDMS"). A reporting system is then able to query the results of both security controls in the data store, and correlate control results to a single asset by distinguishing assets by reconciliations ID.

3. Third Example Workflow—Discovery Through Integrations

Similar to the first example workflow, an integration with one or more third party repositories of asset records extracts and publishes those assets to the reconciliation service on a continuing basis. Third party repositories can range from as simple as a spreadsheet of asset names, to tools that analyze network behavior to determine presence of computing devices (such as Nmap).

In certain embodiments, one or more security control applications publish assets they are aware of to the reconciliation service, also on a continuous basis. Security control software applications are typically made aware of assets through the installation of scanning agents on the computing device, or through manual declaration of the asset in the security control software.

The reconciled assets output as a result are collected into a reporting data store. Analytic systems can query that system to identify and display to a user which subsets of the assets in an enterprise are covered by a selected security control (e.g., by each of the security controls).

D. Example Reconciliation Frameworks

Figure 12:
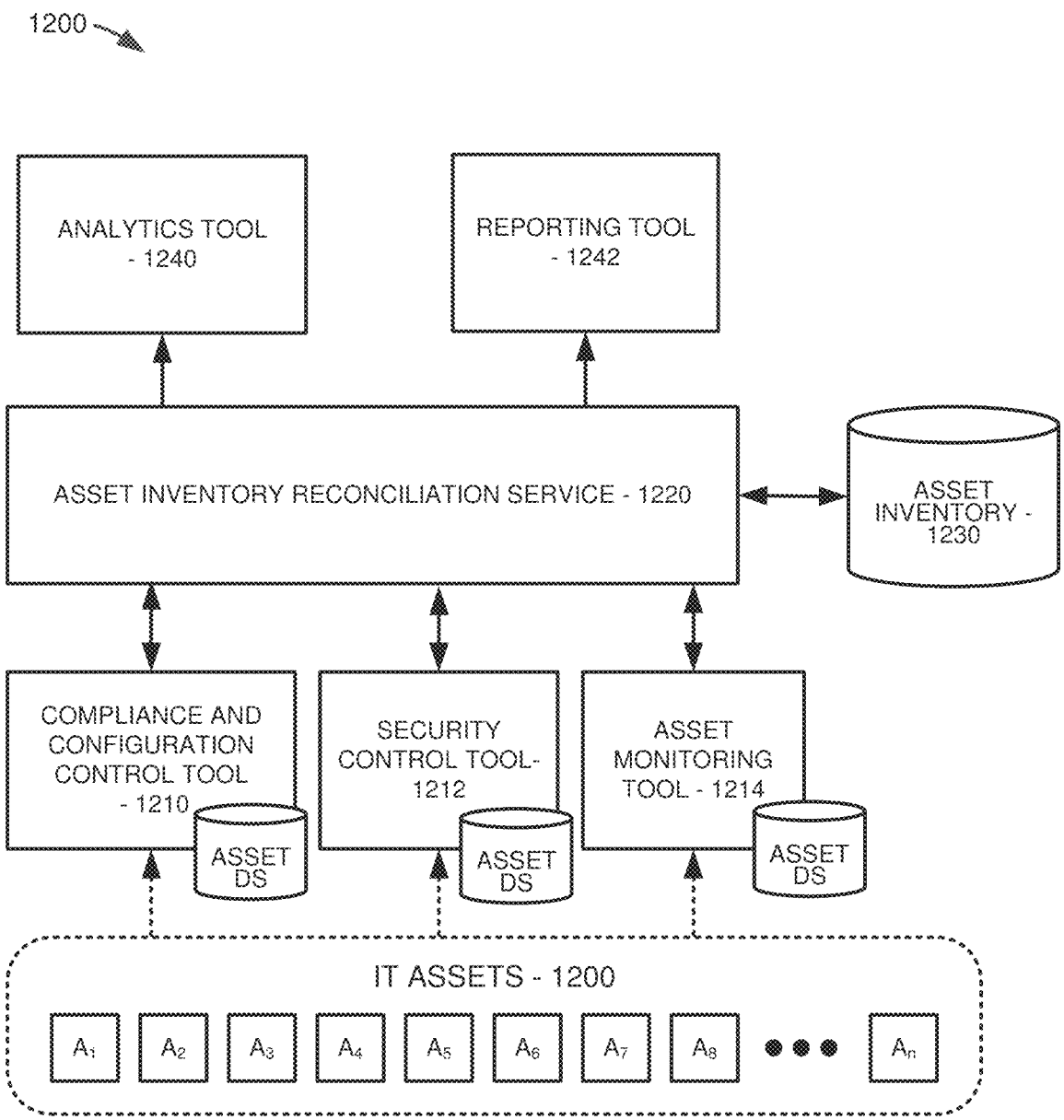
FIG. 12 is a high-level block diagram showing a first example framework in which embodiments of the disclosed asset inventory reconciliation service can operate.
Figure 13:
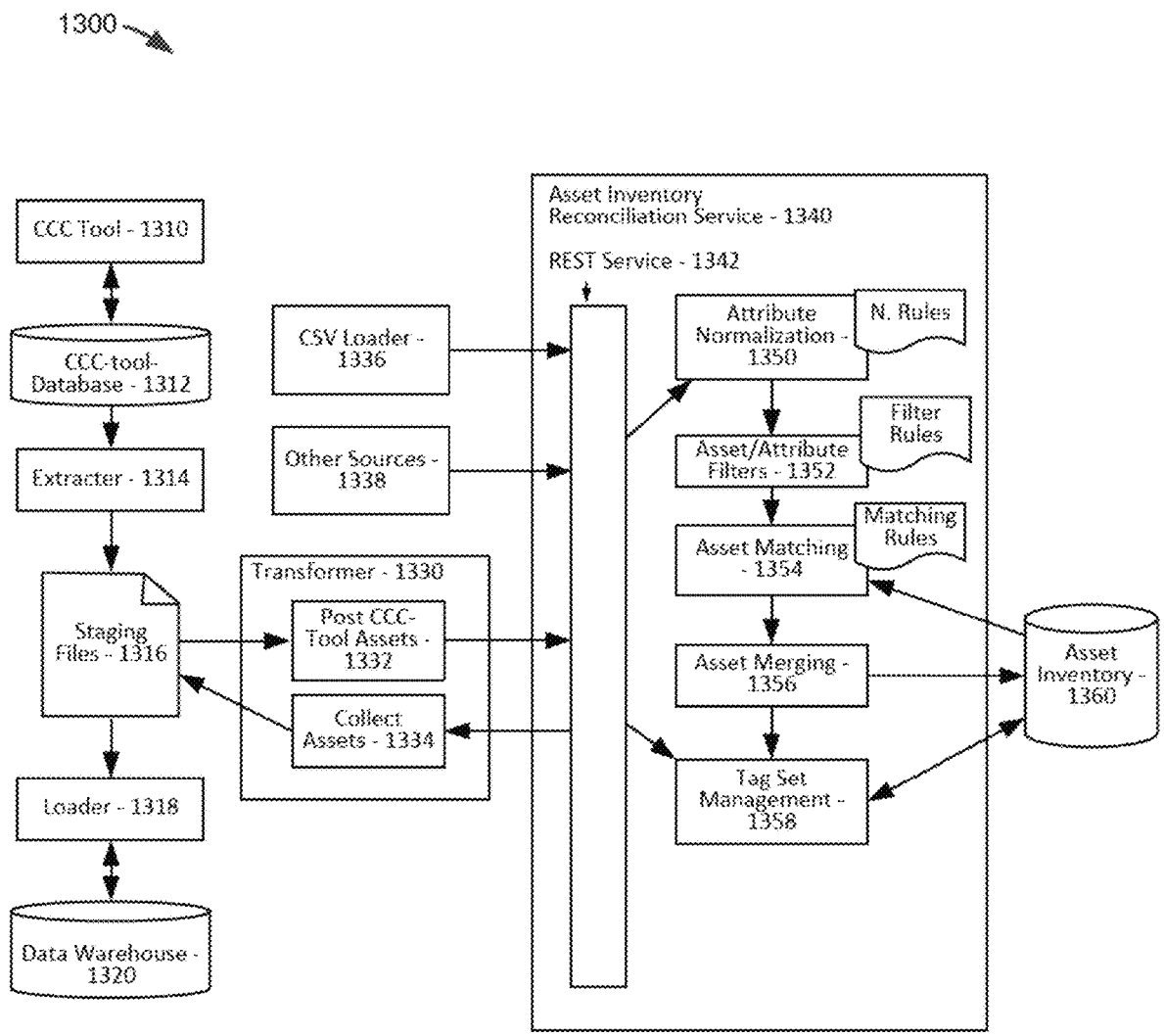
FIG. 13 is a block diagram of a second example framework showing a more detailed example implementation of the asset inventory reconciliation service.

FIGS. 12 and 13 are block diagrams illustrating example frameworks in which embodiments of the disclosed asset inventory reconciliation services can operate.

FIG. 12 is a high-level block diagram showing a first example framework in which embodiments of the disclosed asset inventory reconciliation service can operate. The particular components displayed should not be disclosed as limiting, as the disclosed technology can be used in a variety of different scenarios and use case.

In FIG. 12, assets 1200 represent assets in an information technology ("IT") environment that are desirably discovered, monitored, and, where appropriate, managed. For purposes of this discussion, the assets (illustrated as $A_1$ to $A_n$) can be IT assets within an enterprise and comprise, for example, servers, desktops, directory servers, hypervisors, databases, middleware applications, network devices, virtual infrastuctures, and/or other such assets. For instance, in particular implementations, the assets include assets discoverable by an IT security tool and do not include persons or non-electronic devices.

Compliance and configuration control tool 1210 can be used to detect, analyze, and report on change activity in one or more of the assets 1200. For example, the compliance and configuration control tool can discover and assess configurations of the one or more assets at one or more physical locations and determine whether the assets comply with internal and/or external policies. For instance, the compliance and configuration tool can use software agents that are implemented on each of the assets in order to monitor and report this information to the tool 1210. The compliance and configuration control tool can identify and validate changes to ensure these configurations remain in known and trusted states. In particular implementations, the compliance and configuration control tool operates by capturing a baseline of server file systems, desktop file system, directory servers, databases, virtual systems, middleware applications and/or network device configurations in a known good state. Ongoing integrity checks then compare the current states against these baselines to detect changes. The compliance and configuration control tool collects information used to evaluate detected changes, ensuring they are authorized and intended changes. For instance, the compliance and configuration control tool can crosscheck detected changes with defined IT compliance policies (e.g., using policy-based filtering), with documented change tickets in a change control management (CCM) system or a list of approved changes, with automatically generated lists created by patch management and software provisioning tools, and/or against other desired and approved changes. This allows the compliance and configuration control tool to automatically recognize desired changes and expose undesired changes. The compliance and configuration control tool can also generate one or more reports concerning the monitored assets showing a wide variety of information (e.g., compliance information, configuration information, usage information, etc.). One such compliance and configuration control tool that is suitable for use as tool 1210 is the Tripwire® Enterprise software tool available from Tripwire, Inc. The examples described below are sometimes shown as being used in connection with the Tripwire Enterprise tool. This particular usage should not be construed as limiting, however, as the disclosed technology can be used with other monitoring and reporting tools for an IT environment. Furthermore, the CCC tool 1210 typically generates and maintains its own asset data store (e.g., a change management database) that comprises asset data, such as asset IDs (e.g., synthetic IDs (which comprise identifiers assigned by, the CCC tool as opposed to an external source) and one or more asset properties (such as hostnames, IP addresses, tag information, etc.).

Security control tool 1212 is configured to detect, analyze, and report on one or more security control issues for one or more of the assets 1200. For instance, the security control tool 1212 can be a vulnerability and security risk management tool that measures and manages security risks to the assets 1200. The vulnerability and security risk management tool can itself perform an operation whereby networked assets are discovered and profiled (separate from the CCC tool). For instance, the vulnerability and security risk management tool can profile networked hosts, applications, services, vulnerabilities, and configurations in order to provide a risk management view of the assets separate from the CCC tool. 1210. The security control tool can be configured to perform vulnerability scanning operations on internal networks and/or vulnerability scanning on outward-facing networks, such as scanning for web application vulnerabilities. One such security control tool that is suitable for use as tool 1212 is the Tripwire® IP360 software tool available from Tripwire, Inc. The examples described below are sometimes shown as being used in connection with the Tripwire IP360 tool. This particular usage should not be construed as limiting, however, as the disclosed technology can be used with other monitoring and reporting tools for an IT environment. Furthermore, the security control tool 1212 typically generates and maintains its own asset data store that comprises asset data, such as asset IDs (e.g., synthetic IDs (which comprise identifiers assigned by the security control tool as opposed to an external source) and one or more asset properties.

The discovery mechanism and the information for an asset collected by the security control tool 1212 can, and often will, differ from the CCC tool 1210, making it desirable to reconcile the assets with one another so that an IT administrator has a clear and accurate understanding of the inventory of assets in the enterprise, thus enabling better reporting and management. Furthermore, the assets discovered by the CCC tool 1210 and the security control tool 1212 do not necessarily overlap. In other words, the CCC tool 1210 may detect assets undetected by the security control tool 1212 and vice versa. This potential lack of overlap is represented schematically in FIG. 12 through the dashed lines.

Returning to FIG. 12, asset monitoring tool 1214 generally represents any tool configured to detect and analyze one or more of the assets 1200. The asset monitoring tool 1214 can be, for example, an additional security control tool, such as an additional security control tool configured to detect and monitor other security controls in the IT infrastructure (e.g., one or more of the SANS 20 critical security controls). The asset monitoring tool can be a tool developed by the same company as the CCC tool 1210 and/or the security control tool 121, or can be a third-party tool. Additionally, although only one asset monitoring tool 1214 is shown in FIG. 12, it should be understood that asset monitoring tool 1214 represents one or more such asset monitoring tools. Also, as with CCC tool 1210 and security control tool 1212, the one or more asset monitoring tools 1214 may discover different assets and monitor different information than the tools 1210, 1212 and maintains its own data store for asset information.

Asset inventory reconciliation service 1220 in FIG. 12 is configured to receive information from one or more of the CCC tool 1210, the security control tool 1212, and/or the asset monitoring tool 1214. As more fully explained below, the asset inventory reconciliation service 1220 is configured to perform a reconciliation of assets from a plurality of sources that discover new assets (such as the CCC tool 1210, the security control tool 1212, and/or the asset monitoring tool 1214). The asset inventory reconciliation service 1220 can reconcile asset data so that information collected by the various sources referring to the same asset is recognized as describing or pertaining to the same asset and merged (even though the asset may have different synthetic IDs assigned by their respective sources) so that an accurate and true inventory of assets and their characteristics can be maintained.

In particular embodiments, the asset inventory reconciliation service 1220 performs reconciliation by performing one or more of attribute normalization, application of one or more asset filters, application of one or more attribute filters, asset matching, asset merging, and/or tag set management. An exemplary implementation of the asset inventory reconciliation service 1220 is described below with respect to FIG. 13 and elsewhere in this disclosure.

Returning to FIG. 12, the asset inventory reconciliation service 1220 populates asset inventory 1230. The asset inventory 1230 maintains information concerning the assets 1200 as reconciled by the service 1220, and therefore can be used to inform an IT administrator of the actual inventory of assets in the enterprise of interest. The asset inventory 1230 can be maintained using any suitable database format, and can be treated as a data warehouse. In the illustrated embodiment, the asset data in the asset inventory 1230 is access and retrieved via the asset inventory reconciliation service 1220 (e.g., via a suitable API) but can be accessed directly as well.

The asset data stored in asset inventory 1230 comprises the reconciled data from the asset inventory reconciliation service 1220. This reconciled data represents data that is more accurate and more complete than data otherwise available to an IT administrator, chief information security officer ("CISO"), or other IT executive or evaluator. As shown by FIG. 12, this improved data can be accessed and/or evaluated by a variety of tools. For instance, in the illustrated embodiment, the data is used by analytics tool 1240. The analytics tools can be a tool that analyzes the data from asset inventory 1230 concerning the assets and generates one or more metrics and/or reports that reflect the state of the IT assets 1200 (e.g., in terms of security vulnerabilies, compliance with applicable standards (such as the PCI standard or Sarbannes-Oxley), or other such benchmarks). In one particular implementation, for instance, the data from the asset inventory 1230 is used to compute a vulnerability score or index (referred to as an attack surface index in certain implementations) for the assets in the environment or for the assets in particular subsets for the environment. Example embodiments for computing and displaying such an index are disclosed, for instance, in U.S. Provisional Application No. 61/883,947, filed on Sep. 27, 2013, and entitled "ATTACK SURFACE ANALYTICS" and U.S. Provisional Application No. 61/907,767, filed on Nov. 22, 2013, entitled "ATTACK SURFACE ANALYTICS", which are hereby incorporated herein by reference in their entirety. The data from the asset inventory 1230 can also be used by other tools, such as general reporting tool 1242 or by the source tools, such as CCC tool 1210, the security control tool 1212, and/or the asset monitoring tool 1214.

FIG. 13 is a block diagram 1300 of a second example reconciliation framework showing a more detailed example implementation of the framework. The description below will primarily make reference to the components illustrated in FIG. 13, though it should be understood that these components can be used more generally in the framework of FIG. 12 or other reconciliation frameworks.

In FIG. 13, asset inventory reconciliation service 1340 is illustrated as comprising a representational state transfer ("REST") service 1342 supporting the posting of asset source data to be collected and consolidated against other assets the service is already, aware of. In FIG. 13, ETL processes are illustrated as an extractor 1314, a loader 1318, and a transformer 1330. The extractor 1314 extracts data from database 1312 generated by the compliance and configuration control tool 1310. The database 1312 is sometimes referred to as a change management database ("CMDB") and may be the CMDB populated from a Tripwire Enterprise tool. As assets are extracted they are placed in staging files 1316. During the transform stage performed by the transformer 1330, the extracted assets (shown as post CCC-tool assets 1332) will be transformed to conform to the REST API and submitted to the asset inventory 1360 through the REST API via the asset inventory reconciliation service 1340. This also allows the service 1340 to collect the assets from different instances of the CCC tool. The service 1340 responds to the asset inventory 1360 with the reconciled form of the asset. The transform stage, performed by the transformer 1330, is also configured to input the entire inventory (or a subset of the inventory, if desired) from the asset inventory 1360 for inclusion in the CCC-tool-database 1312. This action is illustrated by the "collect assets" 1334 process block. In certain implementations, all assets for the asset inventory 1360 will reference reconciled assets.

The asset inventory reconciliation service 1340 can also provide management services of tags or tag sets to be applied or retrieved for any of the assets in the asset inventory 1360. Tag set management can be performed, for example, tag set management component 1358, which can be accessed using a tag set API supported by the REST service 1342. An exemplary tag set API is disclosed below. The tag set management component 1358 can be used to perform a variety of actions concerning the tags of the stored asset, including one or more of: listing all tagsets, listing a given tag set and the tag values it supports, submitting a new tagset with a set of tag values, removing a tagset, and/or updating an existing tagset.

As illustrated in FIG. 13, by using the REST service 1342 and the associated API, the asset inventory reconciliation service 1340 can be accessed by a variety of different sources. For instance, the asset inventory reconciliation service 1340 can be accessed by a CSV loader 1336 or, more generally, any other suitable source 1338. Additionally, content that is used during reconciliation (e.g., new content for the reconcilers or for new reconcilers) can also be supplied to the asset inventory reconciliation service 1340.

1. Producing a Reconciled Asset

In general, the reconciled form of an asset collects from the stored source forms, the union of the tags, asset properties, Common Platform Enumerations (CPEs) (such as the CPEs developed by MITRE and referred to generally as CPE Version 2.3), IP addresses and/or synthetic IDs (IDs generated and specified by the source tool) for an asset. It should be understood that this union operation can eliminate duplicate elements or, in some implementations, maintain duplicate elements. In particular embodiments, the reconciled form also comprises an expanding first_observed date and last_observed date. The first_observed date is the earliest date submitted with an asset. The last_observed date is the newest date submitted. This allows the asset inventory reconciliation service 1340 to determine if the security tools or sources are still aware of or operating on the asset and can also assist with merging, as explained below. This information can also inform purging or coverage.

In particular embodiments, the reconciled form further comprises a universally unique identifier (a UUID). For example, when assets are submitted to the asset inventory reconciliation service 1340 that do not match any existing previously reconciled assets in the asset inventory 1360, a new UUID is allocated. When assets are submitted that match, one or more existing assets, the UUID of the asset with the oldest first_observed date is preserved. In particular implementations, the reconciled form maintains the hostname of the newest matching asset based on the last_observed date.

a. Source Form

In particular embodiments, when an asset is posted to asset inventory reconciliation service 1340 via the REST service 1342, it includes an identifier (e.g., "SOURCE") that is reproducible for a given asset from a given asset source (such as a DHCP server, change management database ("CMDB"), VA tool, security control tool, etc), and distinct from other sources. This identifier is used to detect updates of data from a given asset source. For instance, DHCP logs do not have high update requirements, and the "SOURCE" field could be set to "DHCP".

When an update is posted, it can be matched by either the hostname or media access control address (MAC address) with the same reconciled asset, even though the IP address may have changed. The previous data for the reconciled asset that matches the 'SOURCE' value will be replaced. In this case, dis-associating the old IP address, and collecting the new.

In particular embodiments, the source field should be set to a repeatable composite key value that uniquely identifies the asset in the system it is coming from.

b. Content

In certain embodiments, content will be executed in the context of a read-only, transaction. For instance, it shall not be permitted to update any database data; it shall also be sandboxed, as to have no permissions to update the local file-system. Content can be created or updated by a service provider (e.g., a provider of the asset inventory reconciliation service), customer, and/or other user.

In this disclosure, content refers to configuration files that serve as instructions governing the operation of the system that can be shipped in an independent cycle than that of the software solution. In other words, content files are a means of delivering functionality independent of the mechanism. In the context of the asset inventory reconciliation service, the provider of the reconciliation service (or, in some cases, the customer itself) can develop and deliver content files suited to a particular customer base or even for a particular customer without having to perform a full release of the asset inventory reconciliation software. This enables a more "nimble" release cycle and allows a service provider to have greater flexibility in the security marketplace. In certain embodiments of the disclosed technology, for example, the reconciliation rules (applied at 1354), the filtering rules (applied at 1352), and/or the normalization rules (applied at 1350) are "content" and not distributed in compiled form so that they can be adapted to a customer's unique IT asset situation.

c. Normalization

Some attributes may come from source systems in multiple forms, but to enable reconciliation it is desirable to normalize attributes for easy matching. For instance, MAC addresses are reported with colons on POSIX systems, and hyphens on Microsoft systems. Normalization can be performed so that the MAC address attribute has a common form regardless of source.

In the illustrated embodiment, normalization is performed by attribute normalization module 1350 and occurs before filtering so that filtering rules can assume simpler forms. Normalization can be performed, for example, using a, series of rules. These rules can be expressed in a domain specific language ("DSL") so that they can normalize any portion of the asset. Similar to filters, the normalization, rules can be attribute specific.

(1) Example

Two example normalization rules are illustrated below. The first example applies to the IP addresses of the assets and canonicalizes the form of the IP address by utilizing the InetAddresses library routine from Java. In the second example, it is assumed that the source tool records an asset's MAC address as its synthetic ID (though this is not necessarily the case, as a MAC address and a separate synthetic ID may be created by the source tool). The second example normalizes the synthetic ID to use a common form, such as 00:00:00:00:00:00 by replacing the hyphens with colons.

Normalization Examples

```
normalization {
    ipAddressRule { ip ->
        ip.address =
InetAddresses.toAddrString(InetAddresses.forString(ip.address))
        return ip
    }
    syntheticIdRule { synthetic_id ->
        if ( synthetic_id.resource == "mac-address" ) {
            synthetic_id.assetId = synthetic_id.assetId.replace('-', ':')
        }
        return synthetic_id
    }
}
``` d. Filters

In certain embodiments, when an asset is posted and before it is persisted, it will go through one or more types of filtering. For instance, one or both of attribute filtering and asset filtering can be performed. In FIG. 13, asset filtering and attribute filtering are performed by asset/attribute filter 1352.

Attribute filtering is performed to weed out unnecessary (garbage) data, such as loopback IP addresses. Attribute filtering can also be performed using a series of rules expressed in a DSL. In one particular implementation, the filtering rules are expressed in a script in the Groovy programming language masquerading as a .conf file with a domain specific language (DSL) for expressing the filters. Asset filtering can also be expressed with a DSL for rejecting assets outright. This will allow for refusing an asset based on some hostname convention, or because of the subnet expressed in the assets IP address. Both attribute and asset filtering passes will enable the content to evaluate the properties (e.g., all properties) on the source asset.

In particular implementations, the DSL can support declaring a collection of filters for specific attributes by specifying the bean field name of the attribute with the suffix of 'Filter', and passing to that a Groovy closure that when executed will receive the attribute value. When the filters are executed, the appropriate attributes are passed to them, and rejected or preserved based on the Boolean return value of the given Groovy closure. To reject an asset entirely, one can add a filter to the set of filters (asssetFilter); pass it a Groovy closure that can inspect an asset and return true or false, where filters return true (or, alternatively, false) to filter out the value.

(1) Examples

The following example filters reject various values in the ip_address attribute of the source assets:

```
filtering {
    // Filter ipv4 loopback per RFC 1122, Section 3.2.1.3
    ipAddressFilter { ip ->
        ip.address ==~ /127.0.0.\d+/
    }
    // Filter ipv4 link-local per RFC 3927
    ipAddressFilter { ip ->
        ip.address ==~ /169.254.\d+.\d+/
    }
```

-continued

```
    // Filter ipv6 loopback
    ipAddressFilter { ip ->
        ip.address == "::1"
    }
    // Filter ipv6 loopback
    ipAddressFilter { ip ->
        ip.address ==~ /fe80:(:[0-9a-f]+){4}/
    }
}
```

This kind of filtering can be applied to any of the fields. For instance, if one has a security information source that does a bad job of collecting MAC addresses, known invalid values can be filtered out so that they do not inadvertently cause erroneous asset reconciliations.

e. Reconcilers

Reconcilers are content expressions of asset queries based on attributes of the asset being submitted. Each reconciler defined can return one or more matching assets. Typically, a reconciler will have access to all attributes of the asset, and full query expression capabilities, as well as suitable conjunctions (e.g., Groovy conjunctions) for a rich and capable expression. In particular embodiments, all reconcilers defined are run for each incoming asset. In other embodiments, a subset of one or more of the reconcilers are run for an incoming asset.

Furthermore, the reconcilers are content adaptive and can be created or modified by a system administrator or other user in order to reconcile assets according to any one or more desired criteria. For instance, the schema introduced below can be used in order to create any number of reconcilers according to any available asset property (e.g., according to tags, identifiers, or other asset properties). This adaptive and flexible approach allows the asset reconciliation service to be highly scalable and customizable for use with a variety of different asset sources and reporting tools.

In FIG. 13, reconciliation is performed by asset matching module 1354. The collection of results from the asset matching module 1354 is gathered and merged together into a single reconciled asset. In FIG. 13, for instance, merging is performed by asset merging module 1356.

(1) Example

Two example reconcilers are described below. A first example reconciler utilizes access to Grails' objection relational mapping (GORM) Groovy DSL for a query as an extension of the reconciliation DSL. It finds any already known asset that has a matching synthetic ID with the incoming asset. The second example reconciler uses a GORM query method to match on a single attribute value, such as the hostname.

```
reconciliation {
    // Match to assets that share synthetic ids with the given asset.
    reconciler { asset ->
        // for each synthetic id in the given asset
        asset.syntheticIds.collect { syntheticId ->
            // find existing reconciled assets with the same synthetic id attributes
            Asset.withCriteria {
                syntheticIds {
                    eq("resource", syntheticId.resource)
                    eq("assetId", syntheticId.assetId)
                }
            }
        }
```

-continued

```
   }
  }
  // Match to assets with the same hostname as the given asset.
  reconciler { asset ->
      Asset.findAllByHostname( asset.hostname )
  }
}
```

E. Example Reconciliation Methods

This section describes example reconciliation flows that can be performed by the asset inventory reconciliation service 1220 or asset inventory reconciliation service 1340. The particular method acts described are not to be construed as limiting, as they can be performed alone or in any combination or subcombination with one another. Furthermore, the particular ordering is not to be construed as limiting, as the method acts can be performed in different orders or at least partially simultaneously with one another or with other method acts. For example, the normalization, filtering, and reconciliation rules can be applied at least partially concurrently in parallel pipeline stages or in different orders.

Figure 14:
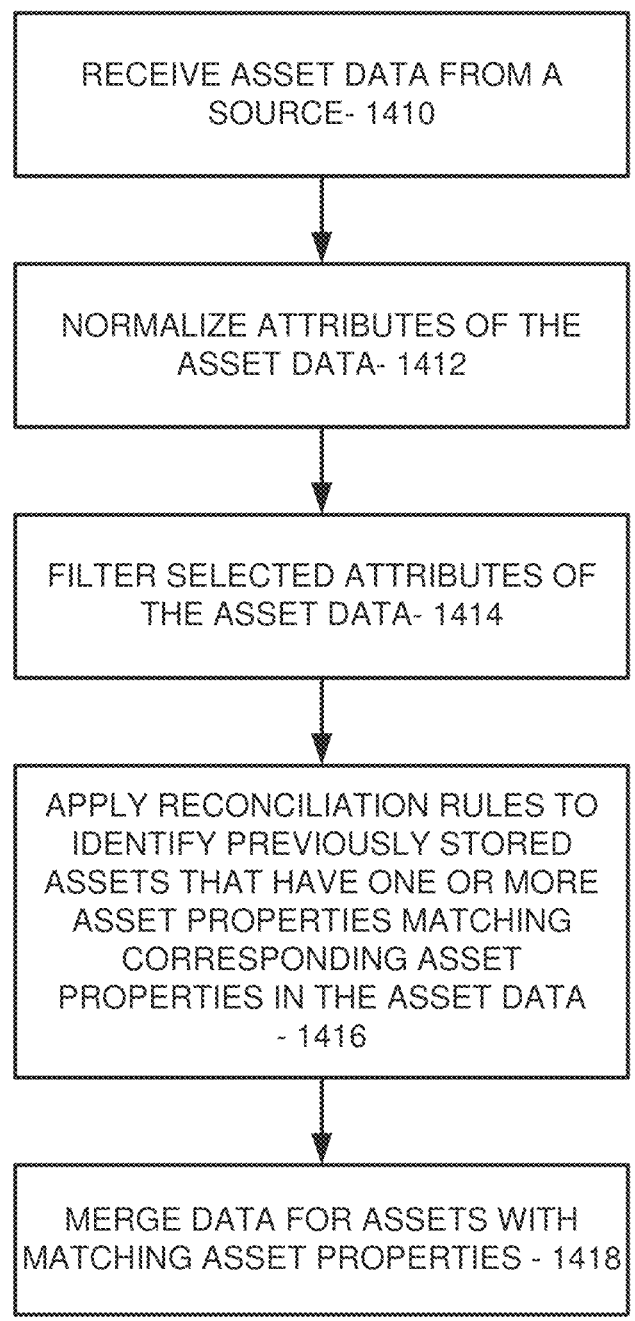
FIG. 14 is a flowchart of an exemplary reconciliation method.

FIG. 14 is a flowchart 1400 of an exemplary reconciliation method.

At 1410, asset data from a source is received (e.g., stored, buffered, input, or otherwise prepared for further processing). The asset data can be received via a REST or messaging API. At 1412, attributes of the asset data are normalized. For instance, and as explained above, MAC address string formats are normalized. At 1414, attributes of the asset are filtered out. For instance, and as explained above, loopback IP addresses can be filtered out. At 1416, reconciliation rules are applied (e.g., reconciliation rules as defined in the reconciliation content are applied) in order to identify previously stored assets that have one more asset properties matching one or more properties of the received asset data. At 1418, assets identified at 1416 as having one or more matching asset properties are be merged to form reconciled asset data.

An example of a reconciliation process is described below. In this example, the source_asset refers to a subset of asset details as provided from a source system, the reconciled_asset refers to the merger of details (e.g., all details) from the source_assets that have been matched together, and the synthetic IDs refer to the asset identifications assigned by various source tools. For example, each synthetic ID can be a tuple representing an asset in the terms of a source system. The ID contains a "resource" part that identifies the system the asset information comes from, and an "asset_id" part that identifies that asset within the resource. Further, in this example, the reconciled_assets further include links to the source_assets used to create the reconciled_assets, and the source_assets used to form the reconciled_assets are maintained in the asset inventory as well as the reconciled_assets.

In one example implementation, when a new source_asset is received, a new reconciled_asset wrapper is created for the source_asset. This new reconciled_asset initially includes the details of the newly received source_asset. In this example, the reconciliation rules attempt to find any previously stored reconciled_asset with at least one matching synthetic_id or matching hostname as the newly received source_asset. (It should be kept in mind that these rules are by way of example only; as explained elsewhere herein, the matching rules can be customized to any desired criteria by modifying the content of the rules.) In many cases, a single previously stored reconciled_asset will be identified as matching. In some cases, however, multiple reconciled_assets will be identified as matching. For instance, it is possible for the source tools to produce source_assets that do not contain sufficient information to link the source_assets together as relating to the same asset. Subsequently, a source_asset from another source tool (or a source_asset that contains additional linking information, such as an IP address or MAC address) can provide information sufficient to link several reconciled_assets together as relating to the same asset. This new source_asset information can therefore serve as the bridge to creating a richer reconciled_asset, which in turn provides additional related data and context for the asset at can be used by downstream analytic and reporting tools.

Continuing with the example implementation, the source_assets associated with the one or more matching reconciled_assets are gathered together into a collection of source_assets. (Since a reconciled_asset may comprise data from and link to multiple source_assets, two or more source_assets may be collected for each reconciled_asset.) If one of those source_assets has the same source ID as the newly submitted source_asset, then it is replaced in the collection of source_assets by the new source_asset (effectively removing the older source_asset having the same source ID). This process of replacing one of the older source_assets in the collection allows updated information to be correctly propagated into the new reconciled_asset and permits asset information to evolve (and even be removed) over time. The source ID can be the synthetic ID as described above, which describes an asset in terms of its asset ID and source system (source tool). The result is a new collection of source_assets.

The new collection of source_asset is used to populate one of the reconciled_assets, effectively generating a merged reconciled_asset. To determine which of the matching reconciled_assets is to be used as the merged reconciled_asset, the first_observed_dates of the reconciled_assets can be used. In one implementation, for example, the oldest reconciled_asset (the reconciled_asset with the earliest first_observed_date) is identified and used as the reconciled_asset into which the collected source_assets are merged. The other reconciled_assets can be discarded. The name of the merged reconciled_asset can also be updated with that of the newest of the source_assets (in order to represent the asset in terms of its most recent name).

To populate the merged reconciled asset, one or more of the collections fields (and, in some embodiments, each of the collection fields) of the collection of source_assets are unioned together and replace the previous sets of attributes on the reconciled_asset. The collection fields can include one or more of ip_addresses, asset_property data, tag data, synthetic IDs, etc. The new state of the reconciled_asset is persisted (e.g., in the asset inventory) and can be made available through messaging and, if appropriate, returned to the REST API caller.

As noted, in particular embodiments, the merged reconciled_asset data includes a collection of synthetic IDs for an asset. This can be desirable since each source_asset may have its own synthetic ID from the source tool, and the maintenance of the union of these synthetic IDs allows reporting tools to have the means to map the reconciled asset back to a source system. This can be particularly useful when the reporting tool or other tool works with the asset in the source system's own APIs.

F. Example API

In this section, an example application programming interface (API) is introduced that can be used in connection with the disclosed technology. This particular API is by way of example only, as it can be modified in detail and arrangement without departing from the principles of the disclosed technology. The API can be a publicly available API (or API made available to clients) to help facilitate custom content. Internal messaging (e.g., using a private API) can be used for internal clients to send source_assets and retrieve a corresponding reconciled_asset.

In particular embodiments, the API manages tags and tag sets that may be associated with any of the assets. Tags are discussed in more detail in U.S. patent application Ser. No. 13/597,242, filed on Aug. 28, 2012, entitled "Managing and Classifying Assets in an Information Technology Environment Using Tags", which is incorporated herein by reference.

In certain implementations, the REST service 1342 provides the API for managing tag sets (TagSets) and the tags within. TagSets and tags are created as needed when assets are posted. However the API allows pre-creation of them, and allows removal of them. In particular implementations, removal will purge the tag from all assets it is assigned to.

The service also provides an API for submitting assets, deleting assets, and/or retrieving assets in mass or individually by ID. For example, assets from the asset inventory 1360 can be retrieved via the API of the REST service 1342.

In particular implementation, the API supports application/json and application/xml formats for input and output.

1. Example Asset REST URLs

```
GET /api/assets/<id>
GET /api/assets/<resource>/<asset_id>
    List details of a reconciled asset by any of the synthetic ids
or reconciliation id
    roles - Asset Admin, Asset Discovery, Asset Audit
GET /api/assets
    returns all reconciled assets
    roles - Asset Admin, Asset Discovery
POST /api/assets
    Submit one or more asset into the system for reconciliation.
This includes updates to assets.
    NOTE: this api will automatically create tagsets and tags
referenced by the assets.
    roles - Asset Admin, Asset Discovery
DELETE /api/assets/<id>
DELETE /api/assets/<resource>/<asset_id>
    Remove a reconciled asset from the system. Id again may be any
of the synthetic ids or reconciliation id
    roles - Asset Admin
PUT is not used (for assets), asset updates are done using POST
    POST an asset ( meaning add ) and the service figures out if it
is new or a modification of an old
    403 Forbidden will be thrown by the server.
```

2. Example URL Encoding the ID

The REST API can support the ID in the URL to be any of the synthetic IDs associated to an asset, as well as the reconciliation ID.

The synthetic Ds are a tuple: a resource defining the context of the id and the ID within that resource. The encoding can be, for example: urlEncode(resource)+/+urlEncode(id)

3. Example Object Representation

Reconciled assets can be represented as flat objects with embedded collections. Further, in some implementations, there will not be references to tags that have to be looked up in subsequent calls. Likewise, assets posted to the interface should contain all of the data the source has about the asset as though it is a new asset, the reconciliation engine will determine if it is an update or create, and perform the merging.

4. Example XML Content Representation

The API can represent details of an asset in the following form:

```
<asset>
    <hostname>___</hostname>
    <first_observed>___</first_observed>
    <last_observed>___</last_observed>
    <reconciliation_uuid>
        <resource>___</resource><asset_id>___</asset_id>
    </reconciliation_uuid>
    <tags>
        <tag><tag_set>___</tag_set><name>___</ name></tag>
        *
    </tags>
    <ip_addresses>
        <ip_address>___</ip_address>
        *
    </ip_addresses>
    <synthetic_ids>
        <synthetic_id><resource_type>___</resource_type><resource>___</resource><asset_id>___</asset_id><resource_type>___</resource_type><synthetic_id>
        *
    </synthetic_ids>
    <asset_properties>
        <asset_property><key>___</key><value>___</value></asset_property>
        *
    <cpes>
```

```
        <cpe>___</cpe>
        *
    </cpes>
    </asset_properties>
</asset>
```

For POST operations the reconciliation UUID tag can be omitted and the collections are also optional (e.g., tags, ipadresses, syntheticIds, metaProperties, etc). In particular embodiments, empty collections for tags, ipaddresses, syntheticIds, and metaProperties will cause the corresponding element to be absent. If there are no tags, then the tags element will not appear in the XML output.

5. Example JSON Content Representation

```
{
    source: "___", <---- Required for POST, not returned on GETS
        hostname: "___",
        first_observed: "___",
        last_observed: "___",
        reconciliation_uuid: { resource: "___", asset_id: "___"
},        <--- ignored for posts, returned on GETS
        tags: [
            { tag_set: "___", name: "___" },
            *
        ],
        ip_addresses: [
            {address:"___"}
            *
        ],
        synthetic_ids: [
            { resource: "___", asset id: "___", resource type: "___"
            },
            *
        ],
        asset_properties: [
            { key: "___", value: "___" },
            *
        ]
        cpes: [
            "___",
            *
        ]
}
```

Again, for POST operations, tags, ipaddresses, syntheticIds, and metaProperties are optional. A reconciliation_uuid is ignored on POST. In certain implementations, empty collections for tags, ipaddresses, syntheticIds, and metaProperties will be absent from the map. If there are no tags, then the tags property will not appear in the BON output.

6. Examples of Tag Management APIs

```
GET /api/tagsets
    List all the tagsets
    roles - Asset Admin, Asset Audit
    Example in JSON:
    request: GET https://pulse/asset-inventory/api/tagsets
    resultBody:
        [
            { name: "Owner", tags: ["Dino","Fred","Pebbles","Wilma"]},
            { name: "Region", tags: ["NYC", "PDX", "SOP"]}
        ]
GET /api/tagsets/<tagset-name>
    List a given tag set and all the tag values it supports.
    roles - Asset Admin, Asset Audit
    Example in JSON:
    request: GET https://pulse/asset-inventory/api/tagsets/Owner
    resultBody:
        { name: "Owner", tags: ["Dino","Fred","Pebbles","Wilma"]}
POST /api/tagsets
    Submit a new tagset with a set of tag values. Use this to
inform tags for that no asset is currently using.
    roles - Asset Admin
    Example in JSON:
    request: POST https://pulse/asset-inventory/api/tagsets
    postBody:
        { name: "Owner", tags: ["Fred","Wilma","Pebbles","Dino"]}
    resultBody:
        { name: "Owner", tags: ["Dino","Fred","Pebbles","Wilma"]}
DELETE /api/tagsets/<tagset-name>
    Remove a tagset from the system, deletes all the references
from any of the assets, and all the tag values.
    roles - Asset Admin
    Example in JSON:
    request: DELETE https://pulse/asset-inventory/api/tagsets/Owner
    resultBody:
        [ "Deleted" ]
PUT /api/tagsets/<tagset-name>
    Update an existing tagset, changing the set of tag values it is
aware of. ( will delete tags from assets )
    roles - Asset Admin
```

-continued

```
Example in JSON:
    request: PUT https://pulse/asset-inventory/api/tagsets/Owner
    postBody:
        { name: "Owner", tags: "Fred","Wilma","Pebbles","Dino","The
Great Gazoo"}
    resultBody:
        { name: "Owner", tags: ["Dino","Fred","Pebbles","The Great
Gazoo","Wilma"}
Note, tags are applied to an asset by posting an update to the
asset.
    Example in JSON:
    request: POST https://pulse/asset-inventory/api/assets
        {
            source: "MYTAGMGR",
            hostname: "tgg-vm74-win7.lab.somebiz.com",
            first_observed: "2012-07-13T12:00:00-0800",
            last_observed: "2013-04-16T16:23:01-0800",
            tags: [ { tag_set: "Owner", name: "The Great Gazoo" }, {
tag_set: "Region", name: "LON" } ]
        }
    resultBody: (presuming asset may exist from other sources )
        {
            hostname: "tgg-vm74-win7.lab.somebiz.com",
            first_observed: "2011-01-13T12:00:00-0800",
            last_observed: "2013-04-16T16:23:01-0800",
            synthetic_ids: [ { resource: "twetmgr:0000", asset_id: "1"
}, { resource: "CAP", asset_id: "023939-230-2039932-202093" } ]
            tags: [ { tag_set: "Owner", name: "The Great Gazoo" }, {
tag_set: "Region", name: "LON" } ]
        }
```

7. Example XML Content Representation for a Tag Set

```
<tag_set>
    <name>____</name>
    <tags>
        <tag>____</tag>
            *
    </tags>
</tag_set>
```

8. JSON Content Representation

```
{
    name: "____"
    tags: [
        "____",
            *
    ]
}
```

9. Messaging

In certain embodiments, a messaging service will allow internal message clients to subscribe to asset creation/updates as they occur. For example, the messaging service can subscribe to a channel to allow submission of assets through messaging. The service can subscribe to a command channel to allow external matching systems to assert that two or more assets must be merged into one reconciled asset. The asset inventory reconciliation service can publish on a subscribable topic the resulting reconciled assets for consumption by interested applications, such as for recording into a security control data mart for reporting and analytics.

G. Example Schema

This section introduces an example schema with which assets can be submitted to and handled by the asset inventory reconciliation service 1340. The submitted source assets can be stored in a relational database management system ("RDBM") along with the reconciled assets. Reconciliation can then be performed on the newly submitted source assets.

1. Example Naming Convention

Table names—lower_underbar_case—example: tag_set
Primary key columns integer, named <table_name>_key—example: tag_set_key
Collections—represented as link tables—<owner_table_name>_<subordinate_table_name>—example: reconciled_asset_tag

2. Tables

```
reconciled_asset ( These are the reconciled form of an asset )
    reconciled_asset_id [ primary key, not null, Integer ]
    hostname [ nvarchar(255), not null ]
    reconciliation_uuid [ nvarchar(128), not null ]
    date_created [ Date, not null ]
    last_updated [ Date, not null ]
    link tables:
        reconciled_asset_tag [ 1..* tag ] - The reconciled set of
tags that apply to the asset.
        reconciled_asset_synthetic_id [ 1..* synthetic_id ] - A
collection of the external references that are valid for this
asset.
        reconciled_asset_asset_property [1..* meta_property ] - The
reconciled set of properties for an asset.
        reconciled_asset_source_asset [ 1..* source_asset ] Holders
for the last version of submitted asset details for each
discovery source
        reconciled_asset_ip_address [ 1..* ip_address ] - collection
of valid ipv4 or ipv6 addresses - will not contain loopback
addresses
```

In certain embodiments, the reconciliation UUID will not be generated from details about the asset, but simply be unique to the system. They will not be reproducable, and once allocated they are opaque, meaning they cannot be decomposed into any details about the asset.

A reconciled_asset can still have a database key, for use in join tables between the collection items.

```
source_asset - Original information from an asset, to support
subtractive merging when sources change.
    source_asset_key
    name [ nvarchar(255) ] - the identifier for asset discovery
source, clients may provide a value unique to each of their
sources
        link tables:
            source_asset_tag [ 1..* Tag ] - snapshot of tags from a given
source
            source_asset_synthetic_id [ 1..* SyntheticId ] - the external
references provided by a given source
            source_asset_asset_property [ 1..* MetaProperty ] - the
property values from a given source
            source_asset_ip_address [ 1..* ip_address ] - collection of
valid ipv4 or ipv6 addresses - will not contain loopback
addresses
```

In particular embodiments, the source_asset is used to hold the collections that need to be merged, so that updates from a given source can have subtractive properties. That is, the reconciled set can be the union of values in all of the source sets. Updates from clients can replace the appropriate source set prior to the reconciler producing the union.

```
synthetic_id -- A reference to the asset from a foreign system,
such as a Configuration Compliance, or Vulnerability Scanner -
this is loosely modeled after synthetic ids as defined in
http://scap.nist.gov/specifications/ai/
    synthetic_id_id [ Integer, primary key, not null ]
    resource_type [ nvarchar(50) not null ] - A label for the
system or service represented by resource_id
    resource_id [ nvarchar(255) not null ] - The context identifier
( which system the asset_id has meaning in. )
    asset_id [ nvarchar(255) not null ] - The foreign ID of the
asset.
tag
    tag_id [ Integer, primary key, not null ]
    tag_set [ nvarchar(255), not null ] - A classification of the
tag.
    name [ nvarchar(255), not null ] - Name of a tag value
asset_property - Details that do not belong as tags, for
instance, OS Version. Tags may be derived from this data in a
future.
    asset_property_key [ Integer, primary key, not null ]
    key [ nvarchar(255) ] - identify the nature of the value (
'key' may be illegal in MSSQLServer, in which case I'll rename
database column to 'name'
    value [ nvarchar(255) ] - the property value.
```

For example, the asset_property is used to store data like te_asset_type=Windows Server, te_asset_type='POSIX Device' etc. In certain embodiments, there will be no constraint that the property name is unique per asset. Different sources are expected to have different details, and assets can be conflated into a single asset, for, for example, dbi, ndi, and fsi assets can be treated as one asset with multiple values for te_asset_type, all of which are valid.

```
ip_address - an ipv4 or ipv6 address string
    ip_address_key [ Integer, primary key, not null ]
    ip_address [ nvarchar(39) not null ] - one string to hold
either ipv4 or ipv6 addresses, as they can be distinguished by
parsers.
```

```
cpe - a Common Platform Enumeration (CPE)
    cpe_key [ Integer, primary key, not null ]
    value [ nvarchar(255) not null ] the string form of the CPE (
v2.3 format : http://nvd.nist.gov/cpe.cfm )
```

VI. Conclusion

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention.

What is claimed is:

1. A system, comprising:
one or more processors; and
one or more computer-readable storage media storing computer-executable instructions that, when executed by the one or more processors, cause the one or more processors to collectively perform operations comprising:
receiving asset information from a plurality of sources in an IT environment, each received asset information describing a corresponding asset in the IT environment;
comparing a first one of the received asset information to previously stored asset information for a plurality of pre-existing assets, wherein each of the pre-existing assets has a corresponding unique identifier that was assigned automatically by the system upon discovery of the respective asset by the system, and wherein the previously stored asset information is stored in a database with the corresponding unique identifiers;
using one or more reconciliation rules applied by the system, determining that the first received asset information is not reconcilable with any of the previously stored asset information and consequently assigning a new unique identifier to the asset corresponding to the first received asset information and storing the first received asset information with the first new unique identifier in the database; and
using the one or more reconciliation rules applied by the system, comparing second received asset information to the previously stored asset information and determining that the second received asset information is reconcilable with previously stored asset information associated with a second unique identifier and consequently merging the second received asset information with the previously stored asset information associated with the second unique identifier,
wherein the merging applies a union operation to synthetic IDs that have been assigned to the respective asset by different source systems monitoring the respective asset, the union operation allowing the respective asset to be correctly mapped back to the different source systems monitoring the respective asset, the union operation further eliminating any duplicative information in the database common to the second received asset information and the previously stored asset information associated with the second unique identifier while maintaining at least the distinct respective synthetic IDs for the second received asset information and the previously stored asset information;

providing the merged asset information with the second unique identifier in the database for the respective asset for a security control operation; and utilizing the synthetic IDs of the merged asset information to map the asset back to each of the different source systems monitoring the asset.

2. The system of claim 1, wherein the previously stored asset information includes an IP address and a hostname for the corresponding asset.

3. The system of claim 1, wherein the storage media store additional computer-executable instructions that, when executed by the one or more processors, cause the one or more processors to collectively perform additional operations comprising:

sending one or more of the asset information stored in the database to a reporting tool that generates reports describing security controls in the IT environment.

4. The system of claim 1, wherein the asset information stored in the database includes tag data associated with the assets, the tag data comprising one or more tags, each tag being configured for association with multiple assets in the IT environment.

5. The system of claim 1, wherein the different source systems monitoring the respective asset include:

a compliance and configuration control (CCC) tool that detects, analyzes, and reports on change activity in assets in the IT environment; and a security control (SC) tool that measures and manages security risks to assets in the IT environment.

6. The system of claim 5, wherein at least one asset in a first set of assets discovered in the IT environment by the CCC tool is different from that in a second set of assets discovered in the IT environment by the SC tool.

7. The system of claim 1, wherein the first received asset information includes a media access control (MAC) address or a hostname for the corresponding asset, and the comparing is based on the MAC address or the hostname.

8. The system of claim 1, wherein the receiving asset information is via an application program interface (API) employing a representational state transfer (REST) standard.

9. The system of claim 1, wherein the storage media store additional computer-executable instructions that, when executed by the one or more processors, cause the one or more processors to collectively perform additional operations comprising:

prior to the comparing, performing one or more filtering operations on the received asset information.

10. The system of claim 9, wherein the one or more filtering operations comprises an attribute filtering operation that removes data from one or more of the received asset information.

11. The system of claim 10, wherein the removed data comprises a loopback IP address.

12. The system of claim 9, wherein the one or more filtering operations comprises an asset filtering operation that rejects one or more assets and corresponding received asset information.

13. The system of claim 12, wherein the asset filtering operation is based on hostname convention or a subnet in an IP address of the received asset information.

14. A system, comprising:

one or more processors; and one or more computer-readable storage media storing computer-executable instructions that, when executed by the one or more processors, cause the one or more processors to collectively perform operations comprising:

receiving asset information from a plurality of sources in an IT environment, the received asset information being information collected from a first asset in the IT environment;

comparing the received asset information for the first asset to previously-stored asset information for a plurality of assets;

using one or more reconciliation rules: (a) determining that the received asset information for the first asset is reconcilable with previously-stored asset information for a second asset, the second asset having a different unique identifier than the first asset; (b) merging the first received asset information with the previously-stored asset information, the merging comprising retaining common information, adding new information from the received asset information, and eliminating outdated information from the previously-stored asset information, and (c) applying a union operation to synthetic IDs that have been assigned to the first asset and the second asset, the union operation further eliminating any duplicative information in the database common to the second received asset information and the previously stored asset information associated with the second unique identifier while maintaining at least the distinct respective synthetic IDs for the second received asset information and the previously stored asset information;

providing the merged asset information as being for the second asset having the different unique identifier for a security control operation;

utilizing the synthetic IDs of the merged asset information to map the asset back to each of the different source systems monitoring the asset.

15. One or more non-transitory computer-readable storage media storing computer-executable instructions that, when executed by one or more processors, cause the one or more processors to perform a method, the method comprising:

receiving asset information from a plurality of sources in an IT environment, the received asset information being information collected from a first asset in the IT environment;

comparing the received asset information for the first asset to previously-stored asset information for a plurality of assets;

using one or more reconciliation rules: (a) determining that the received asset information for the first asset is reconcilable with previously-stored asset information for a second asset, the second asset having a different unique identifier than the first asset; (b) merging the first received asset information with the previously-stored asset information, the merging comprising retaining common information, adding new information from the received asset information, and eliminating outdated information from the previously-stored asset information, and (c) applying a union operation to synthetic IDs that have been assigned to the first asset and the second asset, the union operation allowing the first and second assets to be correctly mapped back to different sources monitoring the first and second assets, respectively, the union operation further eliminating any duplicative information in the database common to the second received asset information and the previously stored asset information associated with the second unique identifier while maintaining at least the distinct respective synthetic IDs for the second received asset information and the previously stored asset information;

providing the merged asset information as being for the second asset having the different unique identifier for a security control operation;

utilizing the synthetic IDs of the merged asset information to map the asset back to each of the different source systems monitoring the asset.

* * * * *